(12) United States Patent
Oh

(10) Patent No.: US 8,436,817 B2
(45) Date of Patent: May 7, 2013

(54) DATA INPUT DEVICE BY DETECTING FINGER'S MOVING AND THE INPUT PROCESS THEREOF

(76) Inventor: Eui Jin Oh, Daejeon (KR)

( * ) Notice: Subject to any disclaimer, the term of this patent is extended or adjusted under 35 U.S.C. 154(b) by 389 days.

(21) Appl. No.: 12/452,486

(22) PCT Filed: Jul. 11, 2008

(86) PCT No.: PCT/KR2008/004118
§ 371 (c)(1),
(2), (4) Date: Jan. 4, 2010

(87) PCT Pub. No.: WO2009/008686
PCT Pub. Date: Jan. 15, 2009

(65) Prior Publication Data
US 2010/0134428 A1    Jun. 3, 2010

(30) Foreign Application Priority Data

Jul. 11, 2007  (KR) .................. 10-2007-0069542
Apr. 2, 2008   (KR) .................. 10-2008-0030612
Apr. 17, 2008  (KR) .................. 10-2008-0035618

(51) Int. Cl.
*G06F 3/041* (2006.01)
(52) U.S. Cl.
USPC ...................................... 345/173; 178/18.01
(58) Field of Classification Search .......... 345/173–179; 178/18.01–18.09, 18.11, 19.01–19.07; 715/773
See application file for complete search history.

(56) References Cited

U.S. PATENT DOCUMENTS

| | | |
|---|---|---|
| 2001/0036299 A1 | 11/2001 | Senior |
| 2006/0181517 A1 | 8/2006 | Zadesky et al. |
| 2006/0284710 A1 | 12/2006 | Takatsuka et al. |
| 2006/0284831 A1 | 12/2006 | Rosenberg |

FOREIGN PATENT DOCUMENTS

| | | |
|---|---|---|
| CN | 1531679 | 9/2004 |
| CN | 1648825 | 8/2005 |
| CN | 1705056 | 12/2005 |
| EP | 1688830 | 8/2006 |
| JP | 11-338628 | 12/1999 |
| JP | 2005-190460 | 7/2005 |
| JP | 2007-503052 | 2/2007 |

(Continued)

*Primary Examiner* — Stephen Sherman

(57) ABSTRACT

Disclosed herein are a data input device and an input conversion method using the data input device. The data input device includes a detection unit provided in a predetermined input region, the detection unit processing first directional input that generates a first directional input signal through detection of lateral pressing in a predetermined radial direction by a finger placed at a reference location in the input region, second directional input that generates a second directional input signal through detection of vertical pressing in a predetermined direction in a state in which the finger is placed at the reference location, third directional input that generates a third directional input signal through detection of tilt pressing in a state in which the finger is placed at the reference location, and fourth directional input that generates a fourth directional input signal through detection of a tilt input in a state in which the finger is placed at the reference location; and a control unit configured to determine input locations of a lateral pressing direction, vertical pressing direction, tilt pressing direction and tilting direction of the finger, extract relevant data from memory, and input the extracted data; wherein the data is input through combination of two or more of the first to fourth directional inputs.

23 Claims, 19 Drawing Sheets

FOREIGN PATENT DOCUMENTS

| | | |
|---|---|---|
| JP | 07-104913 | 4/2007 |
| JP | 2009-516260 | 4/2009 |
| KR | 2000-330688 | 11/2000 |
| KR | 1020040002918 | 1/2004 |
| KR | 1020050078190 | 8/2005 |
| KR | 1020050086364 | 8/2005 |
| KR | 1020060046385 | 5/2006 |
| WO | 2005/019987 | 3/2005 |
| WO | 2005/043451 | 5/2005 |
| WO | 2007/055532 | 5/2007 |

[Fig. 1]
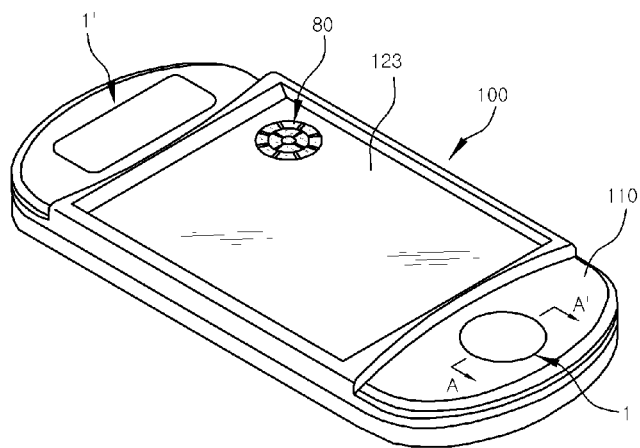
[Fig. 2]
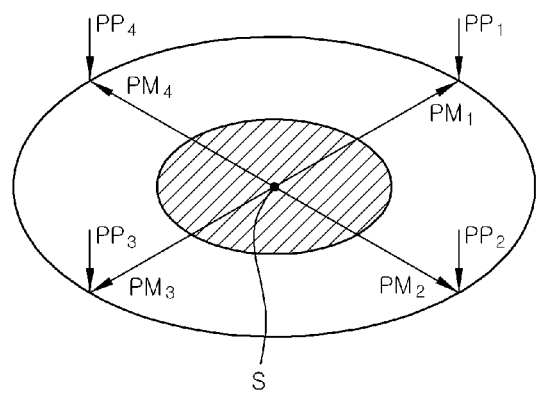

[Fig. 3]
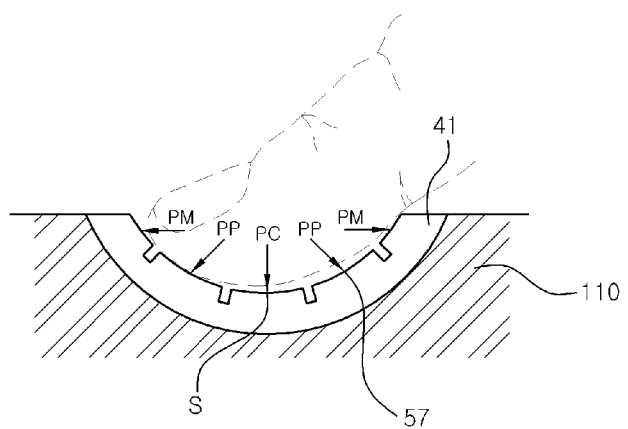
(a)
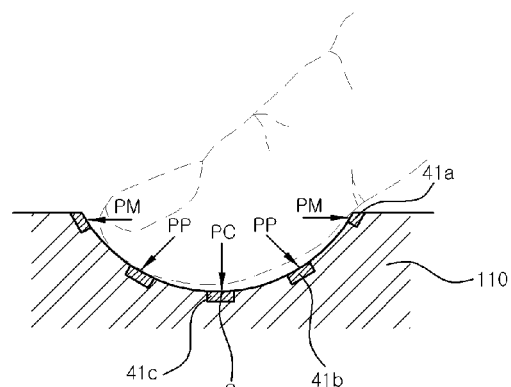
(b)

[Fig. 4]
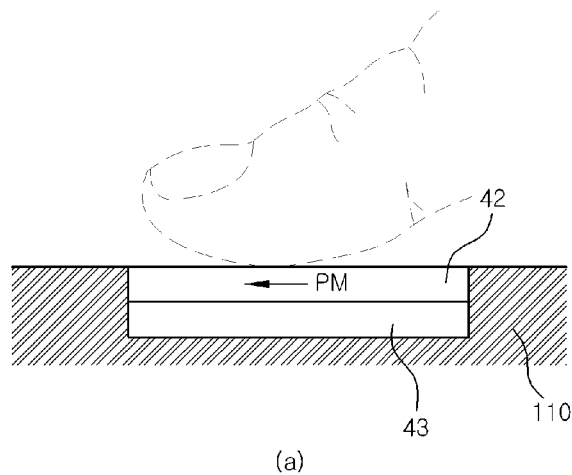
(a)
(b)
[Fig. 5]
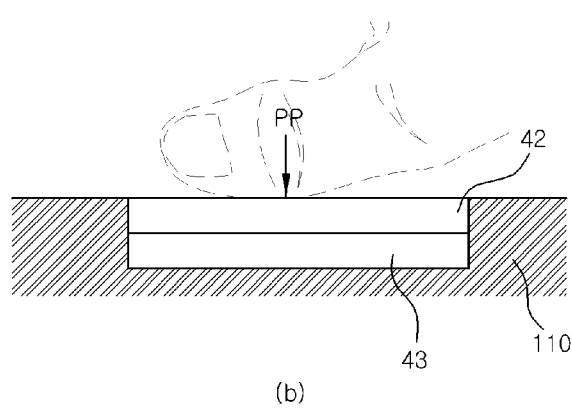
[Fig. 6]
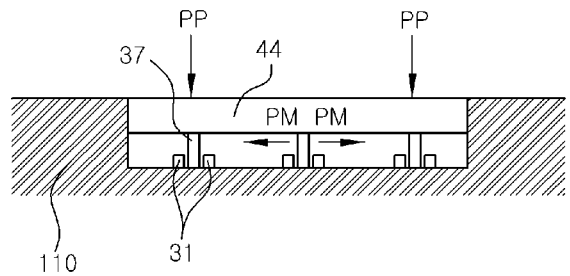

[Fig. 7]
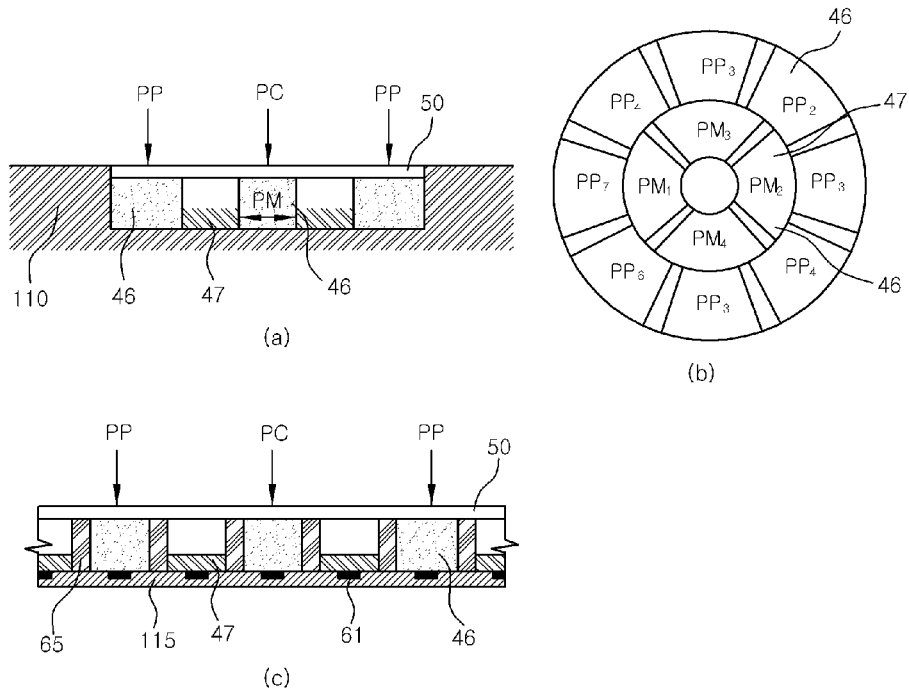
[Fig. 8]
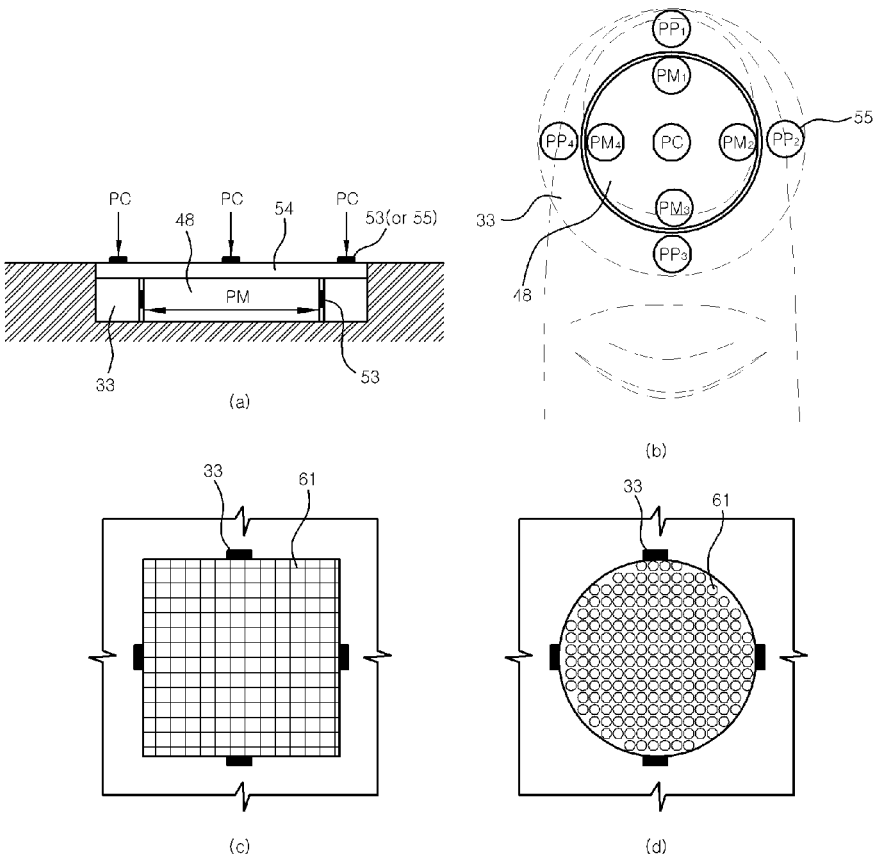

[Fig. 9]
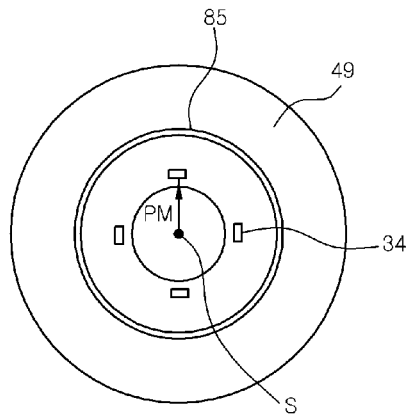
[Fig. 10]
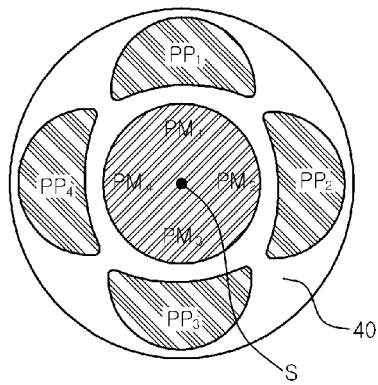
(a)
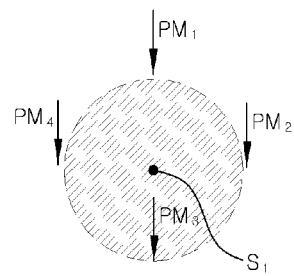
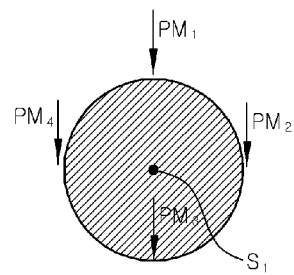
(b)

[Fig. 11]
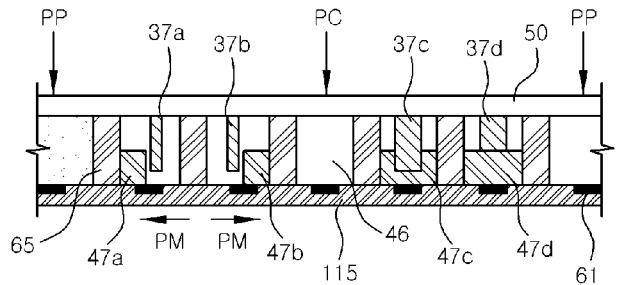
[Fig. 12]
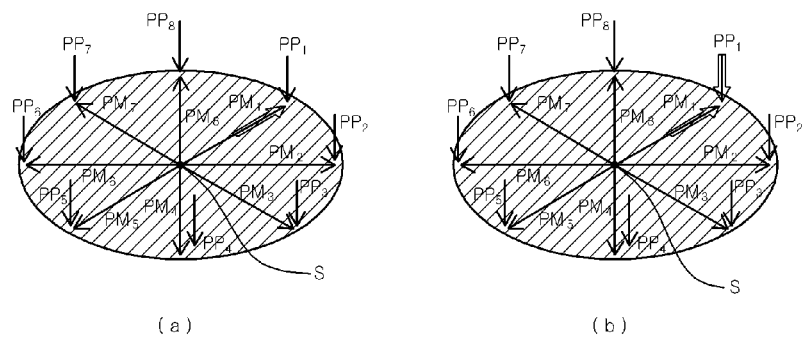
(a)　　　　　　　　　　(b)
[Fig. 13]
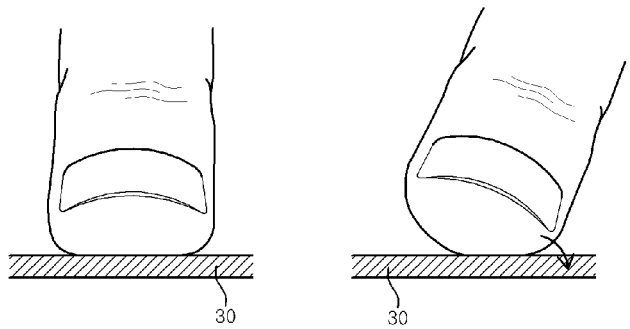
(a)　　　　　　　　　　(b)
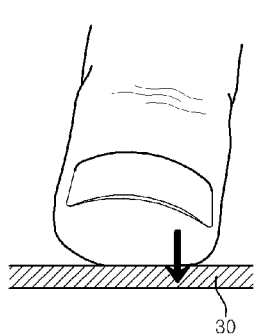
(c)

[Fig. 14]
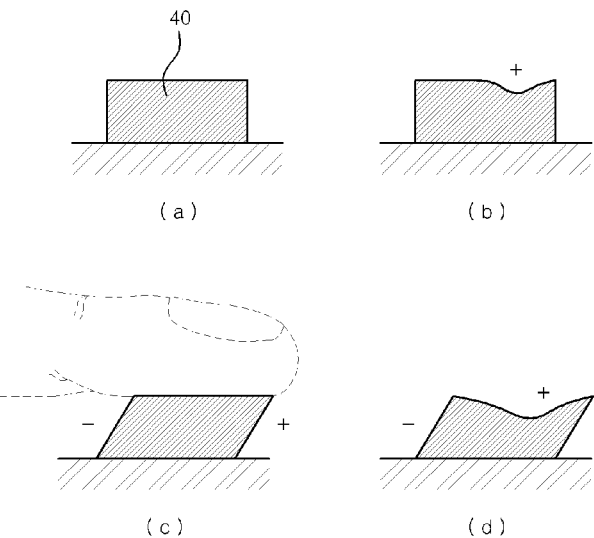
[Fig. 15]
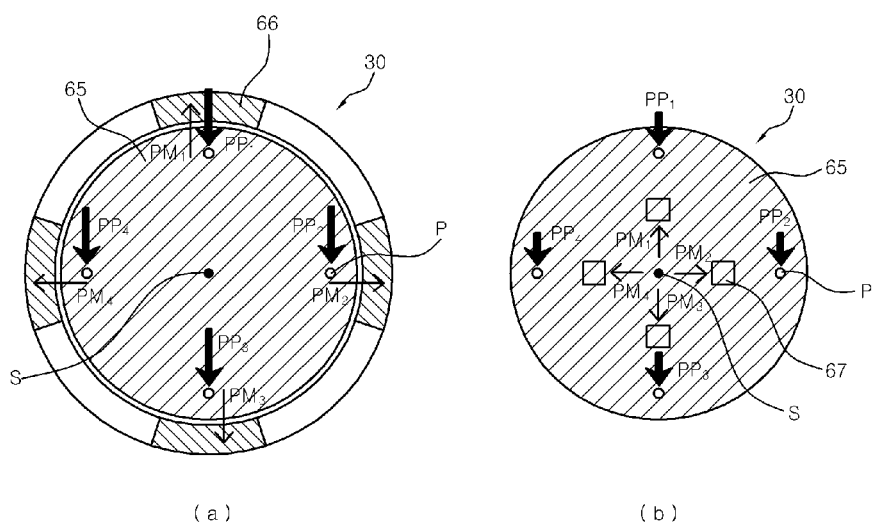
[Fig. 16]
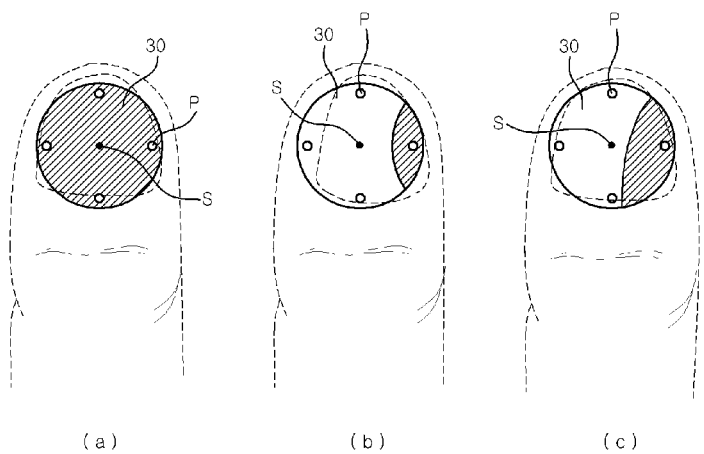

[Fig. 17]
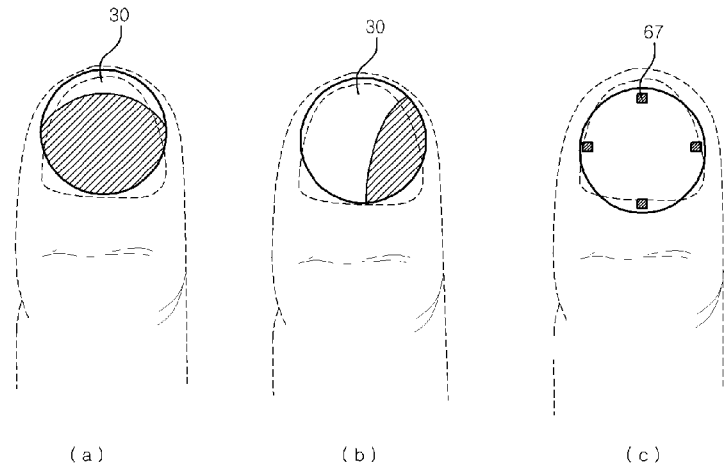
(a) (b) (c)
[Fig. 18]
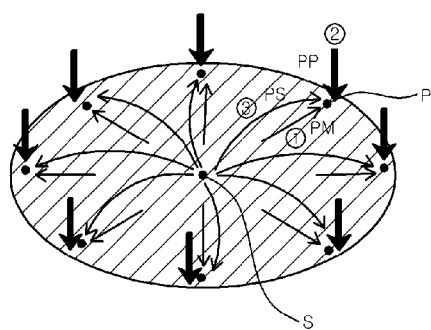
[Fig. 19]
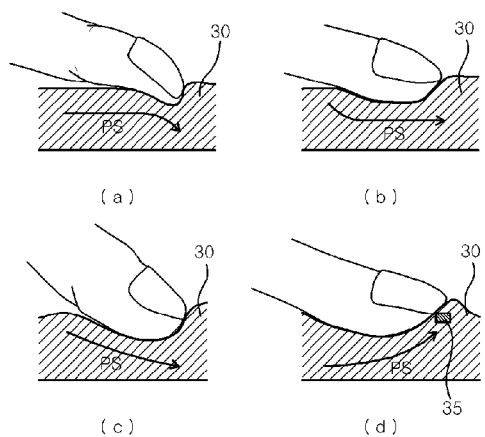
(a) (b)
(c) (d)
[Fig. 20]
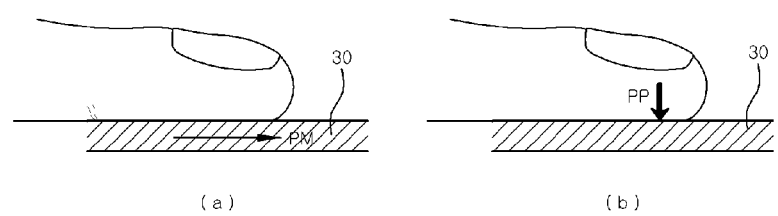
(a) (b)

[Fig. 21]
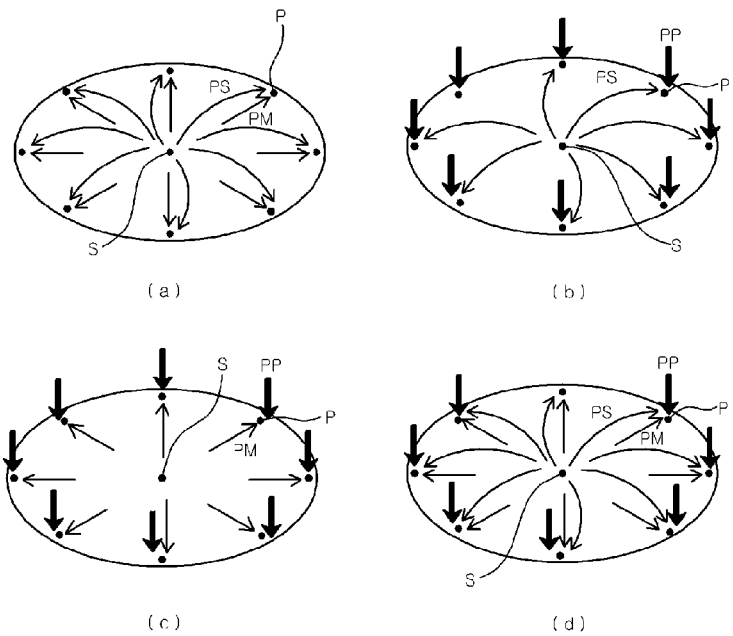
[Fig. 22]
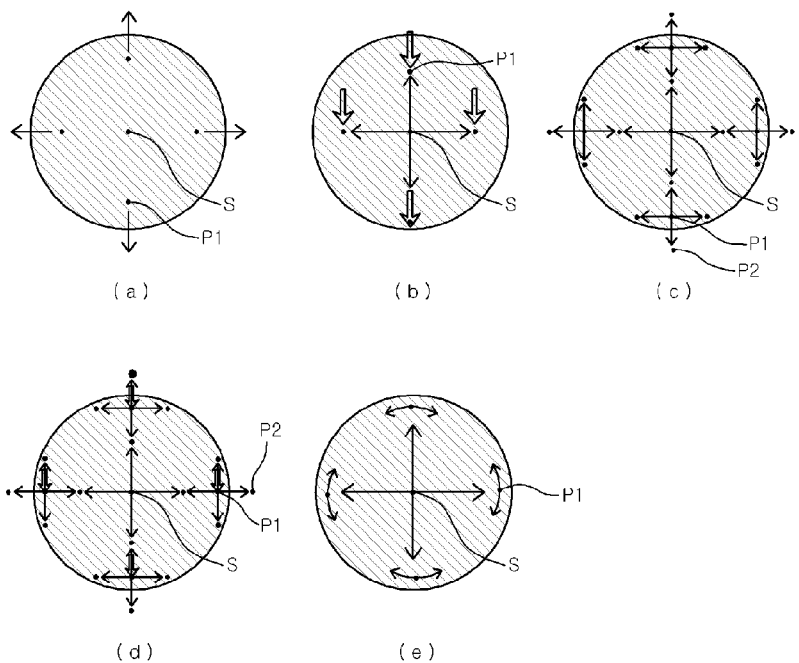
[Fig. 23]
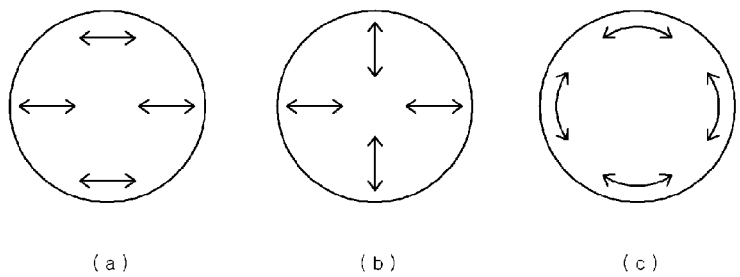

[Fig. 24]
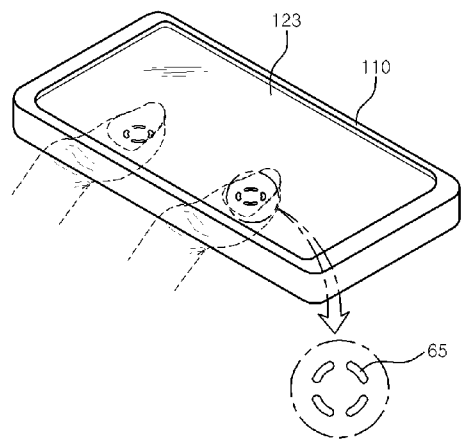
[Fig. 25]
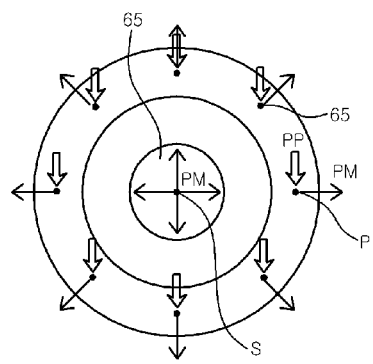
[Fig. 26]
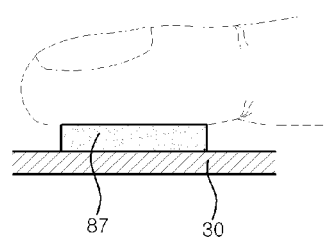
[Fig. 27]
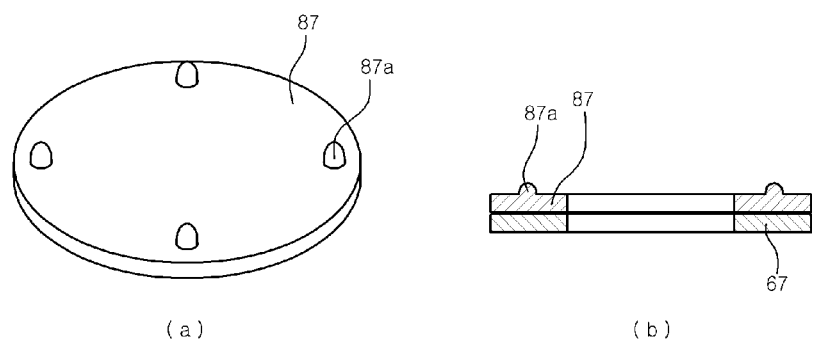

[Fig. 28]
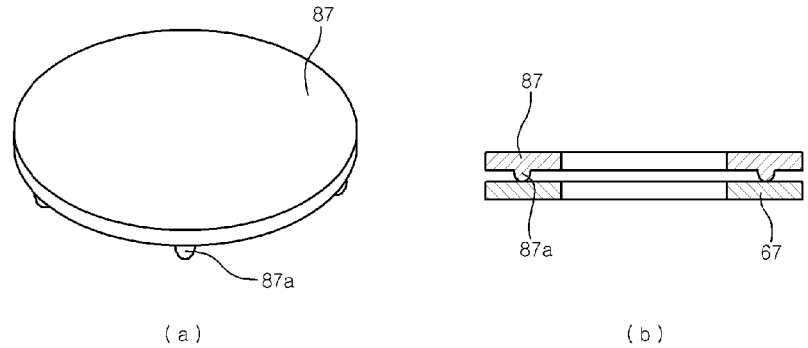
(a)    (b)
[Fig. 29]
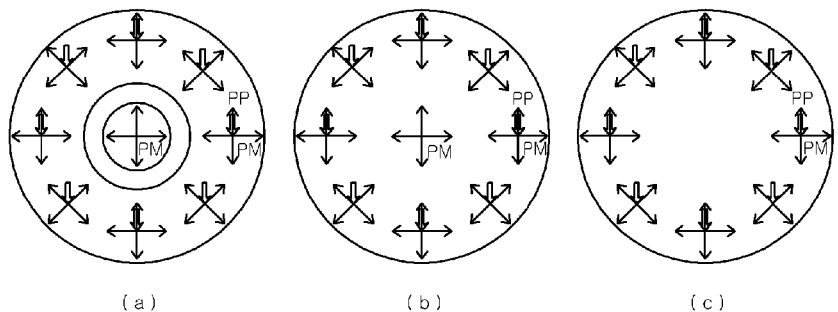
(a)    (b)    (c)
[Fig. 30]
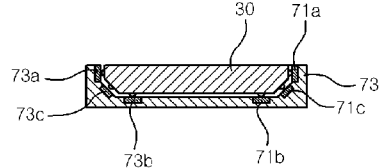
[Fig. 31]
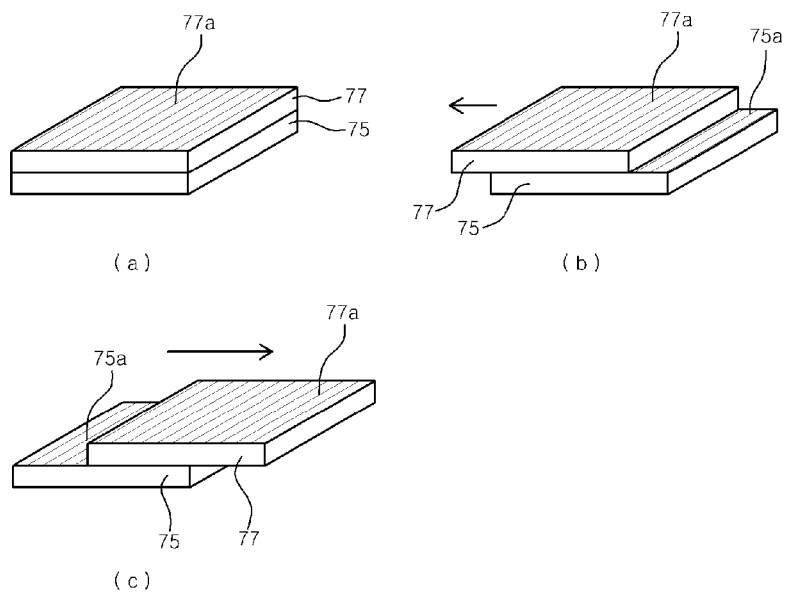
(a)    (b)
(c)

[Fig. 32]
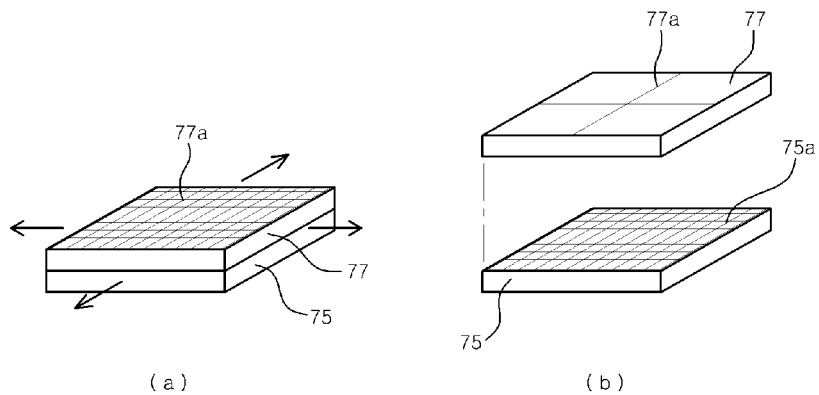
(a) (b)
[Fig. 33]
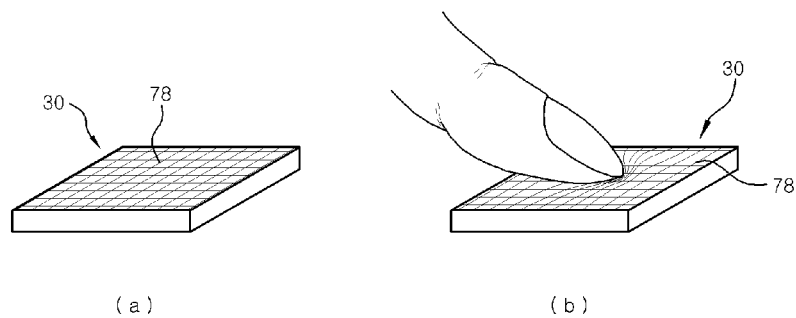
(a) (b)
[Fig. 34]
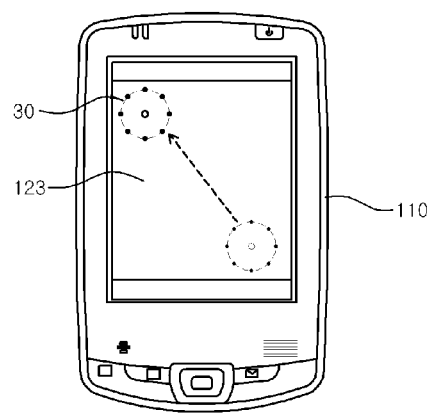
[Fig. 35]
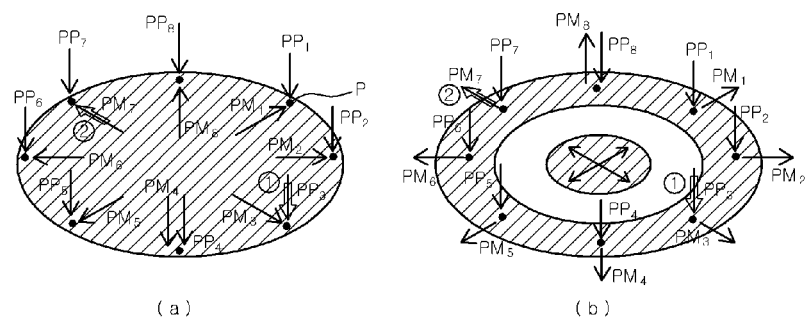
(a) (b)

[Fig. 36]
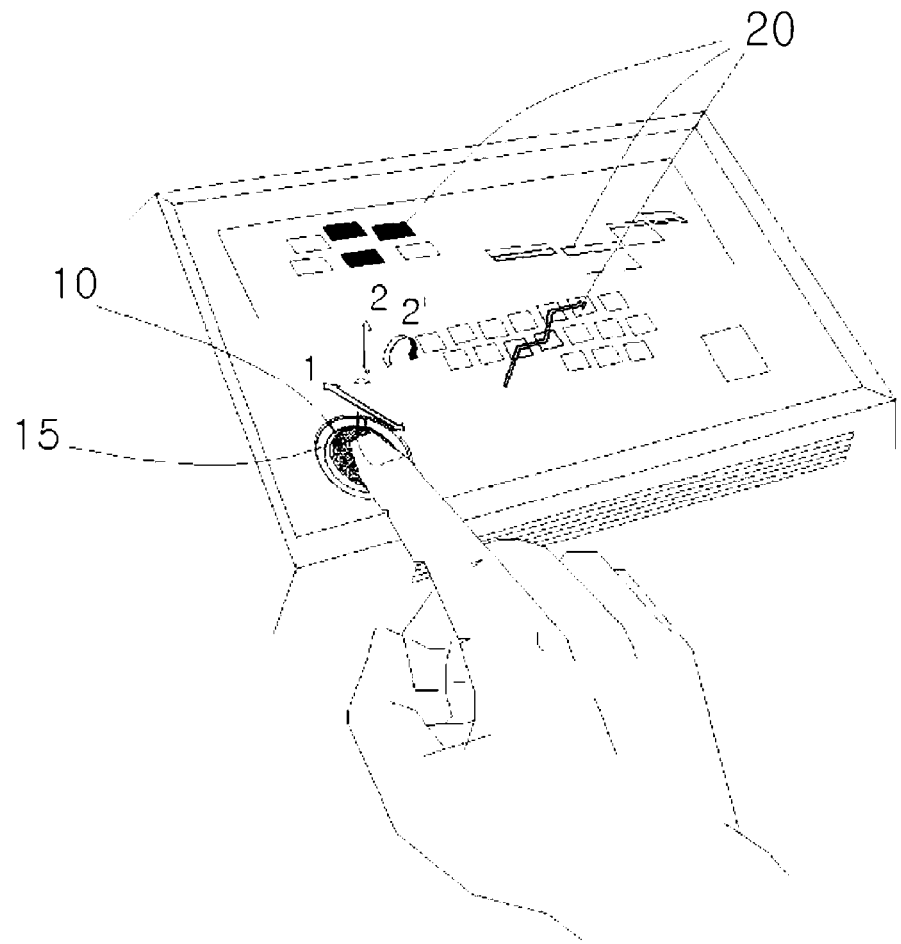
[Fig. 37]
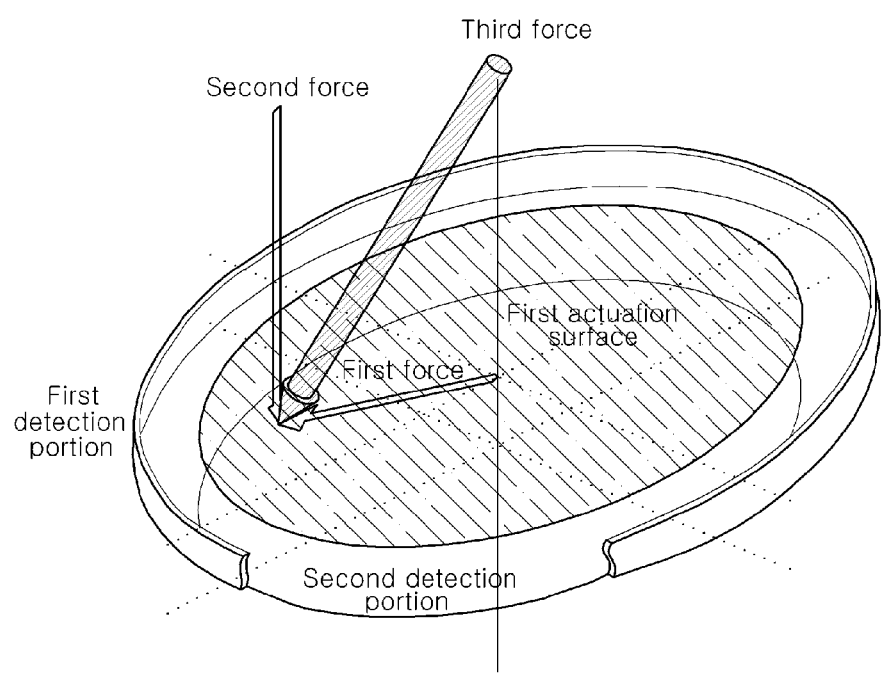

[Fig. 38]
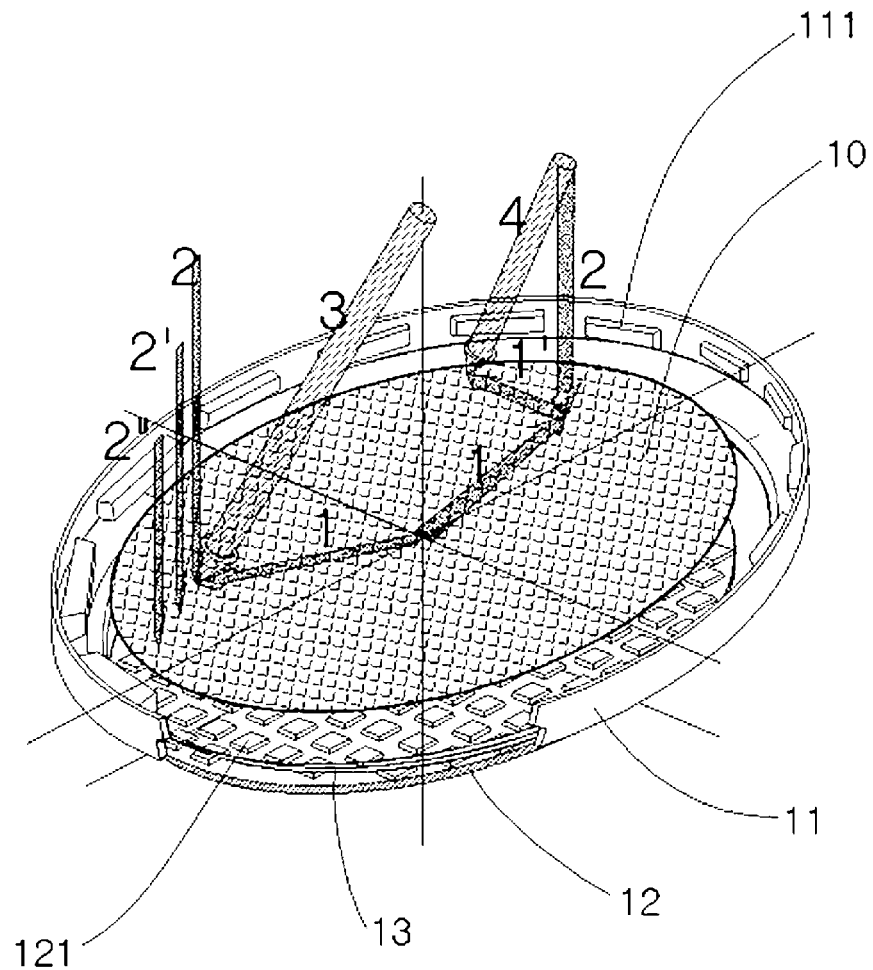
[Fig. 39]
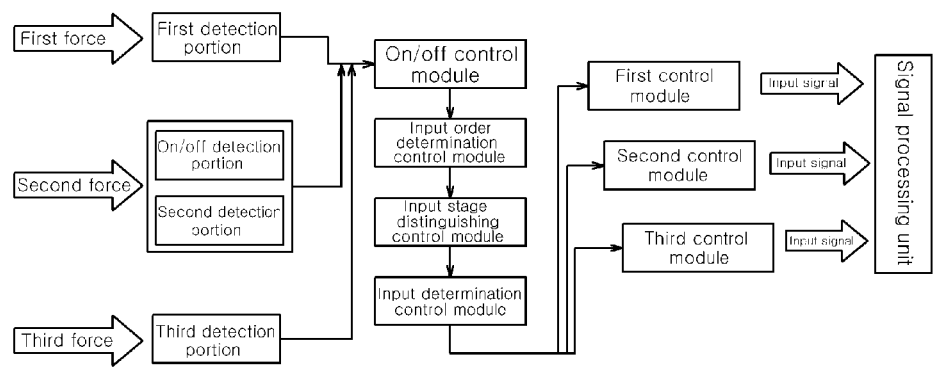

[Fig. 40]
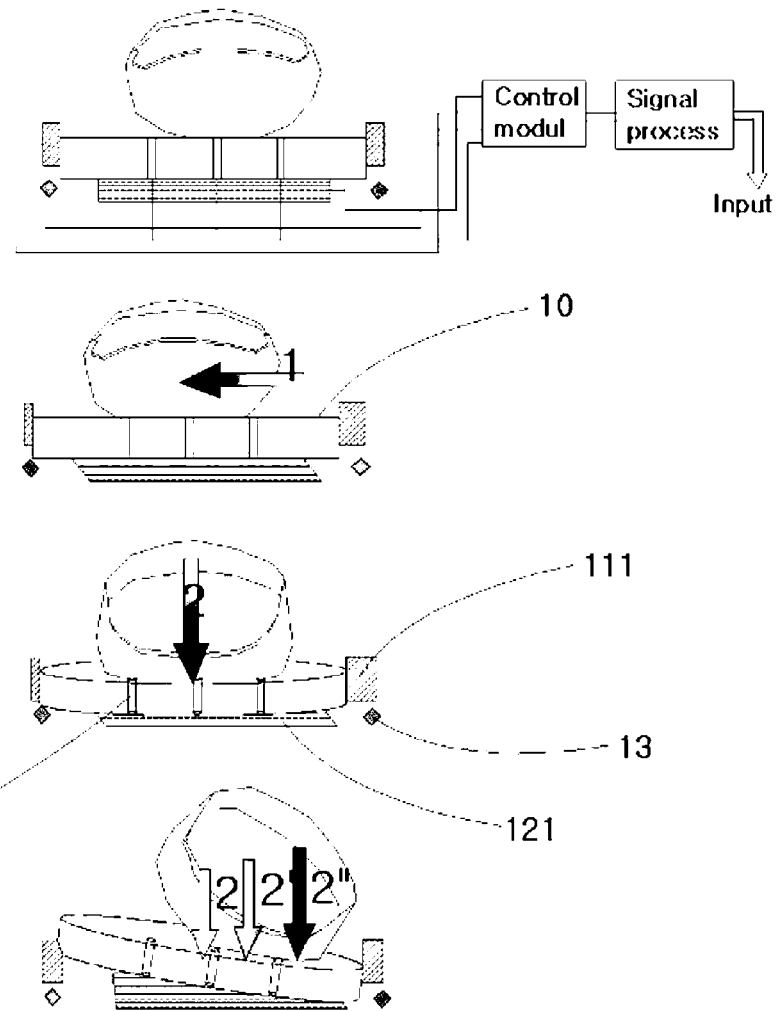
[Fig. 41]
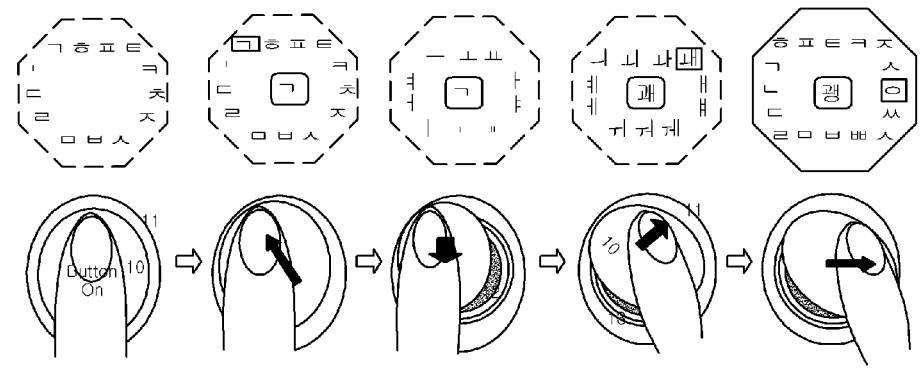

[Fig. 42]
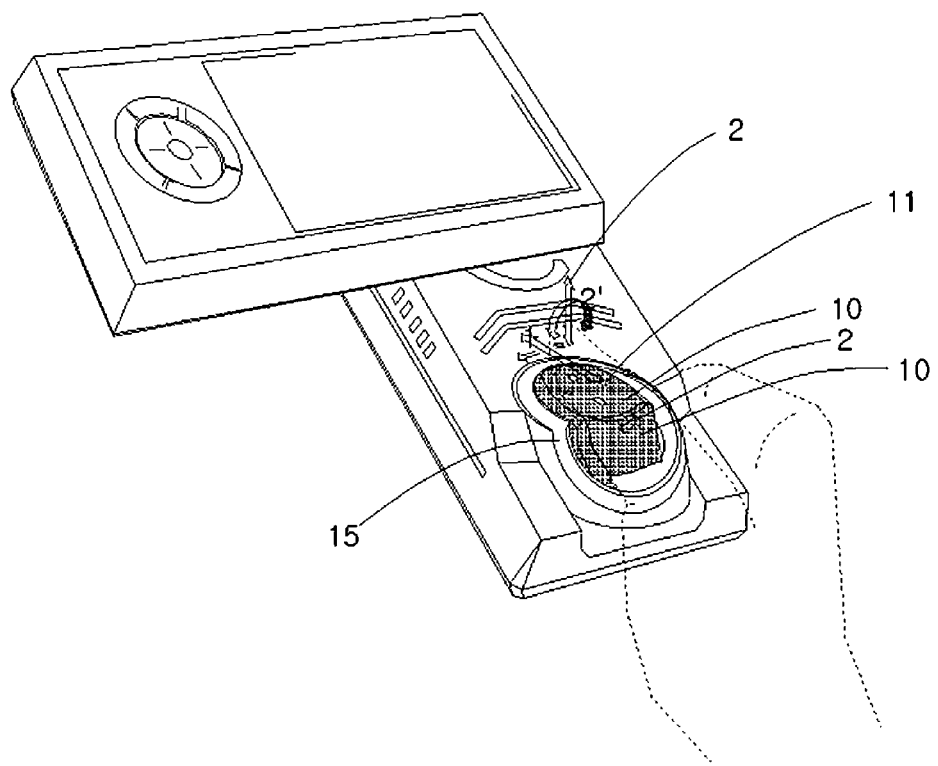
[Fig. 43]
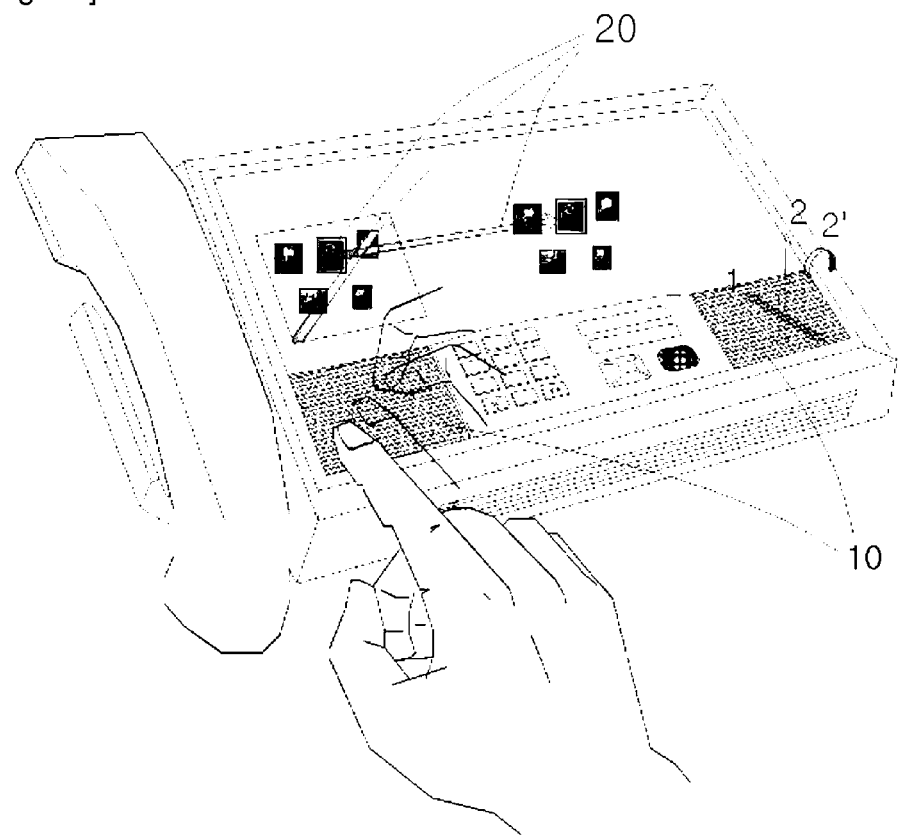

[Fig. 44]
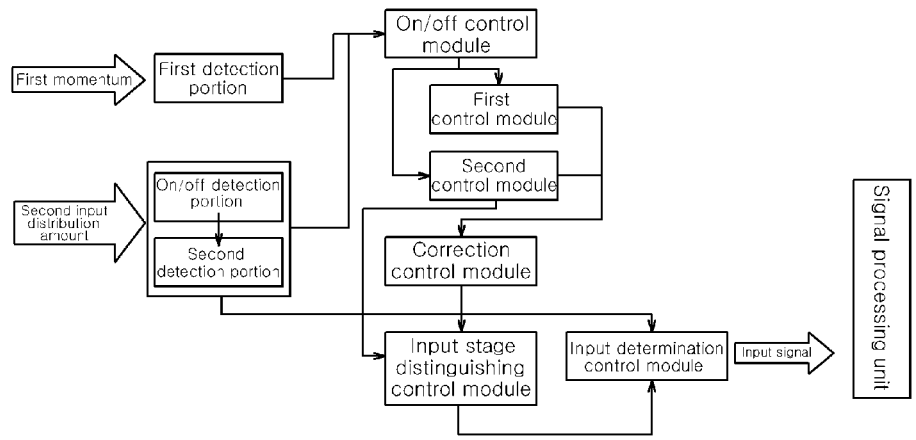
[Fig. 45]
(a) 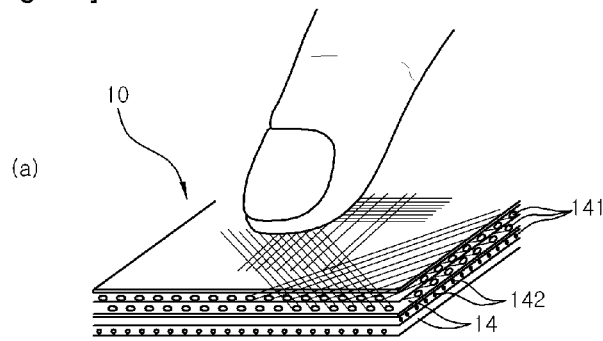
(b) 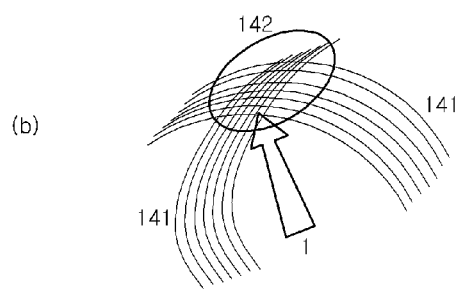
(c) 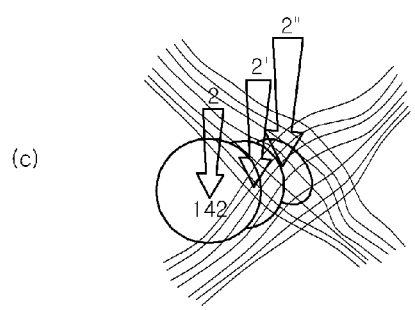

[Fig. 46]
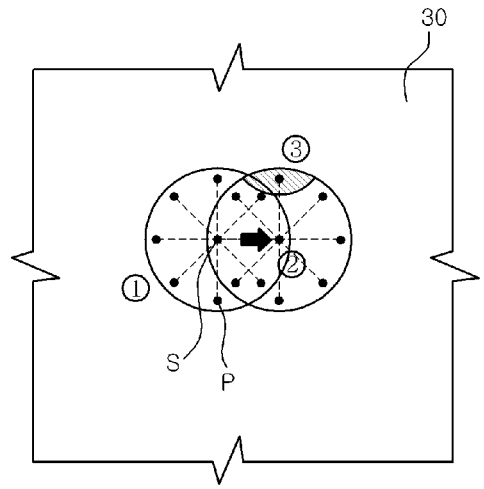
[Fig. 47]
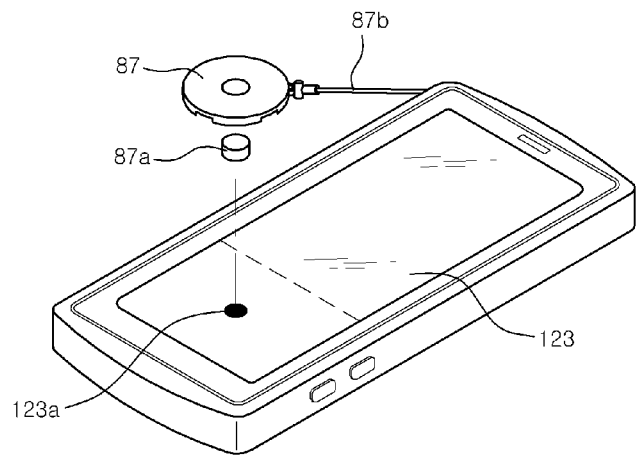
[Fig. 48]
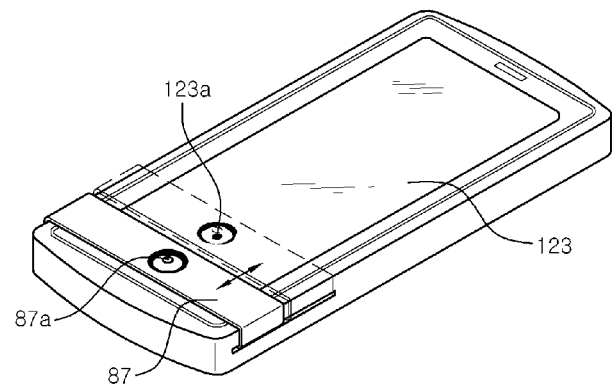

[Fig. 49]
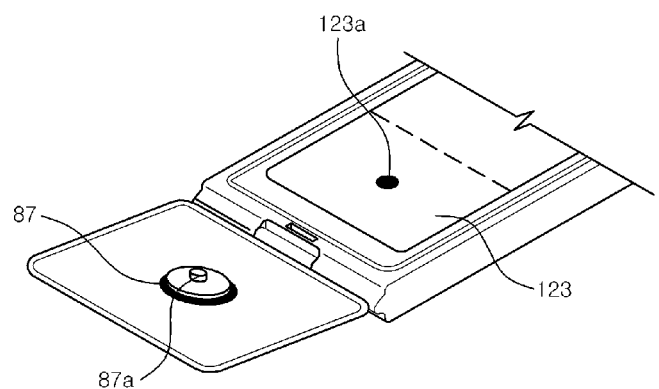

DATA INPUT DEVICE BY DETECTING FINGER'S MOVING AND THE INPUT PROCESS THEREOF

TECHNICAL FIELD

The present invention relates to a data input device and an input conversion method using the data input device, and, more particularly, to provide a data input device using finger action detection, which does not require additional input means for distinguishing and then inputting finger input actions, thereby simplifying product design and realizing small-sized and slim products, and to provide an input conversion method using the data input device.

BACKGROUND ART

Recently, with the rapid development of information processing technology, various types of information devices, such as mobile phones and computers, exhibit high performance and have multiple functions and small sizes.

Such an information device generally includes an input device for inputting data, a data processing device for processing input data, and an output device for outputting processed data. Of these devices, the input device is gradually gaining in importance.

However, various current types of input devices have many problems with the input of various data such as characters and instructions. For example, input devices, such as keyboards, used in Personal Computers (PCs) or notebook computers are not suitable for the realization of small sizes because there is a limitation on the possible reduction in size, and touch screen schemes used in Personal Data Assistants (PDAs) and keypad schemes used in mobile phones are inconvenient because the speed of input is slow and erroneous input frequently occurs.

Meanwhile, since the above-described variety of types of input devices must be provided with input means for transferring finger input actions, they are problematic in that the construction thereof is complicated, which makes product design difficult, and the manufacturing cost thereof increases due to the production and management of related component parts.

Furthermore, since a space for the input means is required on the input devices themselves, they are not suitable for the realization of small-sized and slim products and have degraded external appearances due to the input means which protrude from the casing.

DISCLOSURE OF INVENTION

Technical Problem

Accordingly, an object of the present invention is to provide a data input device using finger action detection, which does not require additional input means for distinguishing and then inputting finger input actions while implementing an efficient data input method, thereby simplifying product design and realizing small-sized products and slim products, and to provide an input conversion method using the data input device.

Another object of the present invention is to provide a data input device using finger action detection, which can provide degrees of freedom related to input to conventional input devices having limited numbers of inputs in small-sized electronic devices, thereby implementing rapid and successive inputs and various combinational inputs through a user's successive and complex actions, rather than the increase in the number of inputs or the repetition of input, and, finally, realizing various and convenient input effects, and to provide an input conversion method using the data input device.

Technical Solution

The above objects of the present invention are accomplished by a data input device using finger action detection, including a detection unit provided in a predetermined input region formed on one side of a casing of a terminal for an electronic device, the detection unit processing first directional input that generates a first directional input signal through detection of lateral pressing in a predetermined radial direction by a finger placed at a reference location in the input region, second directional input that generates a second directional input signal through detection of vertical pressing in a predetermined direction in a state in which the finger is placed at the reference location, third directional input that generates a third directional input signal through detection of tilt pressing, which is performed by diagonally pressing the finger in a predetermined direction, in a state in which the finger is placed at the reference location, and fourth directional input that generates a fourth directional input signal through detection of a tilt input, which is performed by tilting the entire finger in a predetermined direction, in a state in which the finger is placed at the reference location; and a control unit configured to determine input locations of a lateral pressing direction, vertical pressing direction, tilt pressing direction and tilting direction of the finger based on the first to fourth directional input signals, extract data assigned to the corresponding input locations from memory, and input the extracted data; wherein the data is input through combination of two or more of the first to fourth directional inputs.

The detection unit may include a first piezoelectric detection panel having a concave detection region corresponding to a shape of a contact surface of the finger, the first piezoelectric detection panel being provided with the plurality of vertical pressing locations and the lateral pressing directions that are sequentially and radially disposed at different intervals based on the reference location located at a center of the contact surface.

The vertical pressing locations, the lateral pressing directions, and the vertical pressing locations and the lateral pressing directions may be partitioned by deformation prevention grooves.

The detection unit may include a second piezoelectric detection panel configured to come into contact with the finger, to detect vertical pressing, and to generate the second directional input signal; and a third piezoelectric detection panel provided under and in contact with the second piezoelectric detection panel, and configured to detect pushing of the second piezoelectric detection panel in contact with the third piezoelectric detection panel during the lateral pressing, and to generate the first directional signal.

The detection unit may include a fourth piezoelectric detection panel configured to come into contact with the finger, to detect the vertical pressing, and to generate the second directional input signal; a plurality of vertical projections projecting downward from the fourth piezoelectric detection panel; and a first moving detection portion provided in each of the lateral pressing directions around each of the vertical projections, and configured to come into contact with the vertical projections or to be pressed during the lateral pressing, and to generate the first directional input signal.

The detection unit may include a fifth piezoelectric detection panel provided with a through hole at the reference location, and configured to detect the vertical pressing and to generate the second directional input signal; and a second moving detection portion inserted into the through hole, provided to be able to be tilted in each radial direction by the finger, and configured to generate the first directional input signal corresponding to the lateral pressing during the lateral pressing.

The detection unit may include a plurality of sixth piezoelectric detection portions disposed at different intervals around the reference location in band form, and configured to detect the vertical pressing and to generate the second directional input signal; and a plurality of seventh piezoelectric detection portions disposed between the sixth piezoelectric detection portions, and configured to have a height lower than that of the sixth piezoelectric detection portions such that the seventh piezoelectric detection portions are not pressed by the finger during the vertical pressing, to be pressed in the lateral pressing direction by the sixth piezoelectric detection portions during the lateral pressing, and to generate the first directional input signal.

The detection unit may include an eighth piezoelectric detection panel configured to come into contact with the finger, to detect the vertical pressing, and to generate the second directional input signal; and third moving detection portions provided outside the eighth piezoelectric detection panel, and configured to detect contact by pushing of the eighth piezoelectric detection panel during the lateral pressing and to generate the first directional input signal.

The detection unit may include a ninth piezoelectric detection panel configured to come into contact with the finger, to detect the vertical pressing, and to generate the second directional input signal; and fourth moving detection portions provided in the ninth piezoelectric panel to correspond to the respective radial directions around the reference location, and configured to detect contact by pushing of the ninth piezoelectric detection panel during the lateral pressing and to generate the first directional input signal.

The detection unit may be provided as a piezoelectric detection panel configured to be elastically deformed by pressing of the finger; and the control unit may determine that the finger has been placed on the piezoelectric detection panel if pressing force detected by the piezoelectric detection panel is equal to or greater than a set value and equal to or lower than 3 times the set value, determine that the pressing is the lateral pressing if the pressing force is equal to or greater than 3 times the set value and lower than 7 times the set value, and determine that the pressing is the vertical pressing if the pressing force is equal to or greater than 7 times the set value.

The detection unit may further generate a central input signal that is generated through detection of pressing of the reference location by the finger.

At least one of the first directional input signal, the second directional input signal and the central input signal may be divided into two or more multi-stage signals based on intensity of pressing force, and then the multi-stage signals may be generated.

A cover member made of elastic material may be further provided on the detection unit on which the finger is placed.

The cover member may be further provided with sliding prevention means for preventing sliding of the finger.

Each of the vertical pressing locations may be further provided with a pressing projection for concentrating pressing force during the vertical pressing.

Display means for displaying each of the lateral pressing directions and each of the vertical pressing locations is further provided on the cover member.

Characters may be assigned to the respective lateral pressing directions and the respective vertical pressing locations, and, when the first directional input signal or the second directional input signal is received, the control unit may extract a character assigned to the lateral pressing direction or the vertical pressing location, corresponding to the first directional input signal or the second directional input signal, from a memory unit, and input the extracted character.

The lateral pressing may enable a pointer moving function of a mouse or a game character moving function of a joystick to be performed, and the vertical pressing may enable a left and right button manipulation function of the mouse or a character manipulation function of the joystick to be performed.

When a 3D object is manipulated, the lateral pressing may enable the object to be moved, and the vertical pressing may enable the object to be rotated in a vertical pressing direction.

The reference location may be provided to move along with a contact location of the finger placed on the detection unit, and the vertical pressing location may be moved along with the reference location.

The contact movement of the finger may enable a pointer moving function of a mouse or a game character manipulation function of a joystick to be performed, and the vertical pressing may enable a left and right button manipulation function of the mouse or a game character manipulation function of the joystick to be performed.

When a 3D object is manipulated, the contact movement of the finger may enable the object to be moved, and the vertical pressing may enable the object to be rotated in a vertical pressing direction.

The detection unit may further generate a central detection signal that is generated when placing of a finger at the reference location is detected, and the control unit may input first data, assigned to the vertical pressing location, when the central detection signal and the second directional input signal are simultaneously generated, and may input second data, additionally assigned to the vertical pressing location, when only the second directional input signal is generated.

The data input device may further include a keyboard display unit for displaying data assigned to the respective lateral pressing directions and the respective vertical pressing locations, the keyboard display unit selectively displaying first data and second data depending on whether the central detection signal has been generated or not.

The detection unit may further include rotation detection portions having a ring shape, the rotation detection portions being spaced apart from each other at predetermined intervals from the reference location, and, when a finger is rotated around the reference location during manipulation of a 3D object, the object may be rotated and moved in a 2D plane.

The objects of the present invention can be achieved by a data input device provided in a casing of a terminal for an electronic device and configured to input various data, the data input device including a detection unit provided in a predetermined detection region formed on one side of the casing, and configured to include first detection portions and second detection portions, the first detection portions being provided in a plurality of radial directions around a reference location within the detection region so as to correspond to the respective radial directions, and detecting lateral pressing in the respective radial directions by the finger placed at the reference location, and the second detection portions being provided in a plurality of pressing locations radially disposed at regular intervals based on the reference location, and detecting pressing pressure by the finger; and a control unit configured to extract data, assigned to the respective radial directions and the respective pressing locations, from a memory unit based on detection results of the first detection portions and the second detection portion, and to input the extracted data.

The objects of the present invention can be achieved by a data input device using finger action detection, the data input device being provided in a terminal for an electronic device, including a detection unit configured to include a reference plate having first detection lines arranged thereon and a moving plate having second detection lines, corresponding to the first detection lines, arranged thereunder, wherein the second detection lines come into contact with the first detection lines while moving in response to lateral pressing on the moving plate and generate a first directional input signal; and a control unit configured to determine a moving direction and a moving distance of the moving plate based on the first directional input signal, to extract data, assigned to the moving direction and the moving distance, from a memory unit, and to input the extracted data.

The first and second detection lines are arranged successively in matrix form.

One or more of the first and second detection lines include only two detection lines that intersect each other.

The detection unit detects vertical pressing on the moving plate based on pressing of the second detection lines on the first detection lines and generates a second directional input signal.

The reference plate and the moving plate of the detection unit includes a plurality of detection films, and multi-stage vertical pressing input is performed as contact between the detection films is increased in multiple stages based on an extent of vertical pressing on the moving plate.

The detection unit may be connected to a return member having elasticity so that the detection unit can return to its original state after it has performed lateral pressing.

The objects of the present invention can be achieved by a data input device using finger action detection, the data input device being provided in a terminal for an electronic device, including a detection unit provided with an elastic body having a plurality of detection lines arranged in matrix form, and configured to generate a first directional input signal in response to lateral pressing and a second directional input signal in response to vertical pressing when the detection lines are brought into contact with each other by the lateral pressing and the vertical pressing on the elastic body; and a control unit configured to determine contact points between the detection lines and the finger and a number of detection lines in contact based on the first directional input signal and the second directional input signal, to extract data, assigned to the contact points and the number, from a memory unit, and to input the extracted data.

In this case, the detection lines in the matrix form are successively provided at regular intervals in a height direction of the elastic body; and, when the detection lines in a lateral direction are brought into contact with each other by the lateral pressing, the first directional input signal is generated, and, when the detection lines of a vertical direction are brought into contact with each other by the vertical pressing, the second directional input signal is generated.

The objects of the present invention can be achieved by a data input device using finger action detection, the data input device being provided in a terminal for an electronic device, including a detection unit configured to be contracted and relaxed in response to pressing, and to generate a first directional input signal, a second directional input signal and a third directional input signal in response to lateral pressing, vertical pressing and tilting, respectively, on a plurality of indication locations using a current value that varies in response to the contraction and the relaxation; and a control unit which determines a change of the current value based on the first directional input signal, the second directional input signal and the third directional input signal, extracts data assigned to the change of the current value from a memory unit, and inputs the extracted data.

The objects of the present invention can be achieved by a data input device using finger action detection, the data input device being provided with a predetermined detection region in a terminal for an electronic device, including a detection unit for detecting lateral pressing and vertical pressing at a reference location, which is indicated by contact or pressing of the finger with or on the detection region, and at a plurality of first indication locations, which are arranged in a radial direction around the reference location and are indicated, in the detection region, and generating a first directional input signal corresponding to the lateral pressing and a second directional input signal corresponding to the vertical pressing; and a control unit for determining a lateral pressing point and vertical pressing direction of the finger based on the first directional input signal and the second directional input signal, extracting data, assigned to the first directional input signal and the second directional input signal, from a memory unit, and inputting the extracted data.

In this case, the reference location can be displaced, and the first indication locations are moved along with the displacement of the reference location.

The reference location and the first indication locations may be disposed within a range that can be covered with one finger; and the detection unit may distinguish and detect an entire input mode in which lateral pressing input or vertical pressing input is performed on one of the first indication locations while the finger is placed on the detection unit, and a partial input mode in which lateral pressing input or vertical pressing input is performed on one of the first indication locations.

In this case, the detection unit includes detection portions provided at respective locations corresponding to the first indication locations and configured to detect contact of the finger with the first indication locations.

When an input is performed at the first indication locations while the finger is placed at the reference location and the first indication locations The detection unit may determine a contact area of the finger, and determine that the input is performed in the entire contact mode if the contact area is wider than a set area.

When both the lateral pressing and the vertical pressing are detected within a set time, the detection unit may determine the pressing to be tilt pressing, and the control unit inputs data, different from data of the lateral pressing and the vertical pressing, for the tilt pressing.

The data input device may further include an input mechanism portion made of elastic material, in which projections are formed at points corresponding to the first indication locations in order to facilitate input on the first indication locations of the detection unit.

The objects of the present invention can be achieved by a data input device using finger action detection, the data input device being provided in a terminal for an electronic device, including an input portion configured to be elastically deformed by lateral pressing on a plurality of first indication locations spaced apart from each other in a radial direction, vertical pressing on a plurality of second indication locations spaced apart from each other in a radial direction, and tilt pressing on a plurality of third indication locations spaced apart from each other in a radial direction; detection portions provided on lateral and bottom surfaces of the input portion, and configured to detect the lateral pressing, the vertical pressing and the tilt pressing on the input portion, and to generate a first directional input signal in response to the lateral pressing, a second directional input signal in response to the vertical pressing and a third directional input signal in response to the tilt pressing; and a control unit configured to extract data, assigned to the respective input signals, from a memory unit based on the first to third directional input signals, and to input the extracted data.

In this case, pressing projections may be provided in one or more of the lateral and bottom surfaces of the input portion and an inclined surface between the lateral and bottom surfaces of the input portion.

Meanwhile, in order to accomplish the above objects, in the present invention, a construction for detecting data (directions and magnitudes) for various forces, which are transferred from an enterer to a button, successively or simultaneously is required. In greater detail, a moving actuation surface, a detection sensor that can be disposed on the actuation surface, and a control module and a signal processing unit that are compatible with signals generated from the detection sensor are required.

If a touch pad-type input device is used instead of a button in the present invention, a construction for detecting various momentum (speeds and pressures) and pressure distributions transferred to a pad successively or simultaneously is required. In greater detail, a fixed surface for a pad, a detection sensor that can be disposed on the fixed surface, and a control module and a signal processing unit that are compatible with signals generated from the detection sensor are required.

Here, the actuation surface refers to only an actuation, meaning the transfer of a direction and amount of input force to the detection sensor, but does not refer to a moving surface, meaning the reflection of an enterer's finger action as it is. The fixed surface also refers to only a reference surface having a fixed location, meaning the transfer of input momentum and pressure distributions to a detection sensor disposed in a region within the surface, but does not refer to a rigid flat surface, meaning that it is never deformed regardless of an enterer's finger action.

In greater detail, in order to understand the actuation surface and the fixed surface, the actuation surface can include a (rigid) button, which slightly moves within a button casing, as an example. The fixed surface can include, as an example, a (soft) pad, which has a fixed arrangement structure, such as a notebook's touch pad, and is slightly dug or pushed on that way when it is pressed or pushed by a user.

Meanwhile, in order to effectively use an input device in which the above constructions are combined, there is a need for an input program equipped with input conversion data suitable for use purpose of an application device. All of the above-described constituent elements can be acquired sufficiently in the current level of technology in its individual construction.

Furthermore, in order to accomplish the above objects, the present invention provides a data input device using finger action detection, including a detection unit provided in a predetermined input region formed on one side of a casing of a terminal for an electronic device, the detection unit processing first directional input in which a finger placed at a reference location in the input region is laterally pressed toward any one of a plurality of first indication locations radially arranged around the reference location, second directional input in which the finger placed at the reference location in the input region is vertically pressed toward any one of a plurality of second indication locations radially arranged around the reference location, third directional input in which the finger placed at the reference location in the input region is diagonally pressed toward any one of a plurality of third indication locations radially arranged around the reference location, and fourth directional input in which the finger placed at the reference location in the input region is diagonally pressed toward any one of a plurality of fourth indication locations radially arranged around the reference location; a first detection portion for detecting the first directional input; a first detection portion for detecting the second directional input; a first detection portion for detecting the third directional input; a second detection portion for detecting the fourth directional input; and a control unit for extracting first data assigned to the first indication locations where input of the finger has been detected, second data assigned to the second indication locations where the second directional input has been detected, third data assigned to the third indication locations where the third directional input has been detected, or fourth data assigned to the fourth indication locations where the fourth directional input has been detected from a memory unit, and executing the extracted data.

Here, although the first to fourth indication locations may be formed at the same location around the reference location, they may be arranged at different locations around the reference location. Furthermore, although the directions around the reference location are the same, the distances from the reference location may be different.

Furthermore, data may be input by combining two or more of the first to fourth directional inputs.

Moreover, since the other one input may be performed at any one of the plurality of indication locations in the state in which any one of the directional inputs is performed, respective pieces of data assigned to the respective directional inputs may be input at the same time.

Meanwhile, the terms used in the present invention are defined as follows:

1) Input Region

'Input region' refers to an input region (detection region) in which the pressing or minute movement of a finger or an object coming into contact with a finger can be detected, such as a touch panel, a touch pad, a touch screen, a pressure sensor, a tactile sensor and an optical sensor.

2) Lateral Pressing Input

'Lateral pressing input' refers to input in which data assigned thereto is input by performing lateral pressing in a plurality of directions in a radial direction around a reference location. Here, the reference location may be changed to a first indication location, which is spaced apart from the reference location in a radial direction around the reference location. In this case, the 'lateral pressing input' may be used to refer to input in which data assigned thereto is input by performing lateral pressing at a first indication location in a plurality of radial directions.

3) Vertical Pressing Input

'Vertical pressing input' refers to input in which data assigned thereto is input by performing vertical pressing in a plurality of directions in a radial direction around a reference location. Here, the reference location may be changed to a first indication location, which is spaced apart from the reference location in a radial direction around the reference location. In this case, the 'vertical pressing input' may be used to refer to input in which data assigned thereto is input by performing vertical pressing at a first indication location in a plurality of radial directions.

This vertical pressing input refers to an action to perform vertical pressing in a predetermined direction based on the contact area by vertically pressing the edge portion of a contacting finger in the state in which the finger is in contact with an input region (to perform vertical pressing on the edge of the contact portion of the finger, which are brought into contact with the input region, in any one of a plurality of radial directions). In this case, although a part of the finger may be detached from the input region and thus the contact area may be changed, this action is less significant than an action to tilt the entire finger in the input direction by intentionally lifting the part of the finger.

In this case, a direction in which pressing is detected can be determined based on the contact area.

In addition, the contact and the pressing are distinguished from each other based on a preset predetermined pressing detection value. In the case where a value equal to or higher than a predetermined pressing detection value, which allows that a finger is brought into contact with an input region to be determined, or in the case where a pressing detection portion is provided in addition to a contact detection portion and a pressing detection value equal to or higher than a predetermined value is generated by the pressing detection portion, it can be determined that vertical pressing is performed.

4) Tilt Pressing Input

'Tilt pressing input' refers to input in which data assigned thereto is input by performing, in a downward diagonal direction, pressing at a reference location in a plurality of radial directions. Here, the 'tilt pressing input' also includes an input form in which upward diagonal direction input, other than the downward diagonal direction input, is performed or vertical pressing and lateral pressing are performed within a set time.

With regard to this tilting pressing input, if the lateral pressing and the vertical pressing are generated at the same time at a value equal to or higher than a predetermined detection value or a predetermined detection value ratio, pressing under consideration may be determined to be tilt pressing. Alternatively, a tilt detection portion may be further provided and detect tilt pressing.

5) Tilt Input

'Tilt input' refers to input in which data assigned to an input direction is input by performing tilting in which a finger is tilted in the input direction, that is, the entire finger is tilted in the input direction as a contact portion of the finger in a direction opposite to that of the input is detected from an input region. In this case, an input direction may be determined based on a form in which the finger is tilted and a first finger contact area is changed (if the finger is tilted in a predetermined direction, the contact area in the direction opposite to that of the input is eliminated and the contact area of the input direction is increased). Alternatively, when vertical (or diagonal) pressing is detected in a predetermined direction after the finger is tilted and the contact area is eliminated, tilt input may be determined based on a contact area location existing before the contact area was eliminated.

ADVANTAGEOUS EFFECTS

Accordingly, the data input device and the input conversion method using the same according to the present invention enable a great amount of data to be input within a narrow area using one or more input actions at a reference location and indication locations. Furthermore, they do not require repetitive actions through successive input actions, so that erroneous operation attributable to a user's carelessness can be prevented, and thus there is an advantage in that accurate data input can be performed.

In addition, the data input device and the input conversion method using the same according to the present invention have advantages in that they can provide convenient data input due to a simple construction and a simple method of use and can realize the light weight and small size of information devices because they can be applied to various information devices.

Furthermore, according to the present invention, a user can easily convert complicated and successive actions, such as movement, pressing and tilt, which is performed using movable body portions such as a finger, into a great amount of data, and can transfer the converted data to a central processing unit.

Further, the present invention can easily replace the input devices of most small-sized electron devices equipped with only a limited number of simultaneous inputs. Accordingly, fundamental time delay and inconvenient factors, such as repetitive input, re-input and additional input, which are inherent in the input devices of conventional small-sized computer-based electronic devices, can be reduced significantly.

BRIEF DESCRIPTION OF THE DRAWINGS

FIG. 1 is a perspective view of a terminal for an electronic device in which a data input device according to the present invention is mounted;

FIG. 2 is a conceptual view showing the input actions of a finger detected in a first embodiment of the data input device according to the present invention;

FIGS. 3 to 9 are sectional views of detection units according to various embodiments of the present invention;

FIG. 10 is a conceptual view showing the movement of a vertical pressing location attributable to the movement of a finger contact point in the data input device according to the present invention;

FIG. 11 is a sectional view showing a construction in which the embodiments of FIGS. 5 and 7 are combined together;

FIG. 12 is a conceptual view showing combinational input according to the present invention;

FIG. 13 is a view of the embodiment of FIG. 4, which is seen at a different angle;

FIGS. 14 and 15 are diagrams showing detection units according to various embodiments of the present invention;

FIGS. 16 to 23 are conceptual views showing a second embodiment of the present invention;

FIG. 24 is a perspective view showing an example of the implementation of the second embodiment of the present invention;

FIG. 25 is a conceptual view showing the implementation of the second embodiment of the present invention;

FIGS. 26 to 28 are diagrams showing an input mechanism portion according to the second embodiment of the present invention;

FIG. 29 is a conceptual view showing the use of the second embodiment of the present invention;

FIG. 30 is a sectional view showing a third embodiment of the present invention;

FIG. 31 is a perspective view showing a fourth embodiment of the present invention;

FIGS. 32 and 33 are perspective views showing examples of the modification of the fourth embodiment;

FIG. 34 is a front view showing the location displacement of the detection unit of the present invention;

FIG. 35 is a conceptual view showing the input method of the detection unit of the present invention;

FIG. 36 shows an information terminal in which a button-type input device according to the present invention is mounted;

FIGS. 37 and 38 are diagrams conceptually showing force applied to an actuation surface and detection portions for separately detecting the force in respective regions in the button-type input device according to the present invention;

FIG. 39 is a work flowchart showing a method of processing the occurrence of an input signal force acting on the actuation surface of FIG. 38;

FIG. 40 is a diagram conceptually showing the deformation of the detection portions attributable to the movement of the actuation surface of FIG. 38;

FIG. 41 is an example of the implementation in which the process of FIG. 40 is applied to actual character input;

FIG. 42 is a portable terminal in which a button-type input device for detecting second force in two directions using two actuation surfaces according to the present invention is mounted;

FIG. 43 is a complex information device in which the touch pad-type input device according to the present invention is mounted;

FIG. 44 is a work flowchart showing a process of processing the occurrence of an input signal for acting momentum applied to a fixed surface of FIG. 43 and an acting pressure distribution amount;

FIG. 45 is a diagram conceptually showing the deformation of detection lines attributable to momentum applied to the fixed surface of FIG. 43 and a pressure distribution;

FIG. 46 is a diagram showing the concept of successive input in the present invention; and FIGS. 47 to 49 are perspective views showing an example of an input mechanism portion according to the present invention.

MODE FOR THE INVENTION

Embodiments of the present invention will be described in detail with reference to the attached drawings below.

First Embodiment

A data input device 1 using finger action detection according to a first embodiment of the present invention includes a detection unit 30 configured to form a predetermined input region on one side of the casing 110 of an electronic device terminal 100, and a control unit.

The detection unit 30 generates a first directional input signal by detecting lateral pressing in a predetermined radial direction by a finger placed at a reference location S in the input region, and generates a second directional input signal by detecting vertical pressing tilted in a predetermined direction in the state in which the finger is placed at the reference location S. Furthermore, the detection unit generates a third directional input signal by detecting tilt pressing in any one of predetermined radial directions around the reference location in the input region, and generates a fourth directional input signal by detecting tilting in any one of predetermined radial directions around the reference location.

Here, the detection unit may be provided to detect only one or more of the first to fourth directional input signals. That is, assuming that the first directional input signal is '1', the second directional input signal is '2', the third directional input signal is '3' and the fourth directional input signal is '4', the detection unit may be configured to detect two types ('1, 2', '1, 3', '1, 4', '2, 3 ', '2, 4', and '3, 4') of input signals, three types ('1, 2, 3', '1, 3, 4', and '2, 3, 4 ') of input signals, or four types (1, 2, 3, and 4) of input signals. This may be determined according to the number of data to be input through the detection unit or the ease of fabrication of the detection unit.

For example, if all data to be input can be assigned using only two types of signals, the detection unit may be configured to detect the first directional input signal and the second directional input signal. It is apparent that the detection unit may be configured to detect other combinations of two types of signals, which were described above.

Setting may be performed so as to combine two or more of the first to fourth directional input signals and to input new data which is different from data assigned to the respective input signals. Furthermore, when two or more of the first to fourth directional input signals are input successively, data assigned to the respective input signals may be input together.

Here, the reference location S may or may not be set within the input region. In this case, when the reference location S is not set and a finger or an object in contact with the finger comes into contact with the input region, a contact area with which the finger or the object comes into contact may be detected and the center of the contact area may be set as a reference location.

Meanwhile, in the control unit, the first directional input signal is detected as lateral pressing input, the second directional input signal is detected as vertical pressing input, the third directional input signal is detected as tilt pressing input, and the third directional input signal is detected as tilt input.

Furthermore, the term 'lateral pressing input' refers to input in which a finger does not actually move spatially from a first contact point, but the first directional input signal is generated through pressing in a lateral direction (which is not a precise lateral direction, but includes all directions similar to the lateral direction), as shown in FIG. 4(a).

That is, referring to FIG. 2, lateral pressing input PM refers to input in which a finger presses the detection unit 30 in a predetermined lateral pressing direction while the finger is placed on the reference location S (a hatched region in the drawing indicates a surface in contact with the finger). Here, the lateral pressing input is characterized in that it is not performed through an action of scraping a finger against the top surface of the detection unit 30 or a similar action, but is performed while the contact point between the finger and the detection unit 30 is maintained.

Here, the number of lateral pressing directions may be as various as is required. For example, when it is desired to input characters or predetermined data, the number of lateral pressing directions may be limited to a predetermined number, as shown in FIG. 2. Alternatively, when a mouse or a joystick function is performed, all lateral pressing directions may be provided for.

Meanwhile, the term 'vertical pressing input' refers to input that is configured to generate the second directional input signal through vertical pressing in a predetermined direction in the state in which a finger is put on the reference location S, that is, the finger is put on a first contact point, as shown in FIG. 13(c).

In other words, the vertical pressing input PP is performed by vertically pressing a finger on a vertical pressing location in the state in which predetermined vertical pressing locations are provided around the surface in contact with the finger (a hatched region), as shown in FIG. 2.

Accordingly, when a vertical pressing detection value is generated in a specific one selected from among a plurality of radial directions around a reference location, vertical pressing data for the corresponding direction is input.

Although the number of vertical pressing locations is not limited, the vertical pressing locations must be provided near the reference location S such that the reference location S and the vertical pressing locations can be selected through the tilting of a finger.

Furthermore, the term 'tilt pressing input' refers to input that is configured to input assigned data by generating the third directional input signal by pressing in a downward diagonal direction in any of a plurality of radial directions at a reference location. The tilt pressing input may be detected when lateral pressing and vertical pressing are performed together at predetermined detection values or larger or at a predetermined detection value ratio therebetween. Alternatively, the tilt pressing input may be detected by further providing a tilt detection unit.

The tilt pressing input may be performed by pressing in the state in which a finger is tilted with regards to an input region, as shown in FIG. 13(b).

In the above case, the vertical pressing input and the tilt pressing input may be distinguished from each other based on the angle of pressing. Accordingly, different detection values corresponding to different angles may be generated by the same detection portion, and thus the vertical pressing input and the tilt pressing input can be distinguished from each other by using the different detection values. Alternatively, respective detection portions corresponding to the tilt pressing and the vertical pressing may be provided, and thus the vertical pressing input and the tilt pressing input may be distinguished from each other when a value equal to or higher than a predetermined detection value is generated by a detection portion corresponding to predetermined pressing input at the time of inputting the corresponding pressing input, or through a detection portion by which a higher detection value has been generated.

Meanwhile, tilt input refers to input in which the fourth directional input signal is generated by performing tilting in which a finger is tilted in an input direction, that is, the entire finger is tilted in the input direction while the contact portion of the finger the opposite direction is removed from an input region, and the assigned data is input. In this case, as shown in FIG. 4(b), an input direction may be detected based on a form in which an initial finger contact area varies as a finger is tilted (when a finger is tilted in a predetermined direction, the contact area in a direction opposite to the direction of input is eliminated and the contact area in the input direction is increased). Alternatively, when vertical (or diagonal) pressing is detected in a predetermined direction after a contact area has been eliminated through the tilting of the finger, tilt input may be detected based on the location of the contact area that existed before being eliminated.

In this case, a method of determining an each input direction for each type of input is described below.

For lateral pressing input, detection portions may be located in an input region in two or more predetermined directions such that the input direction of the lateral pressing input can be determined, and the input direction of the lateral pressing may be determined based on the detection value of a detection portion.

Alternatively, when the detection portion for detecting the lateral pressing is a detection portion capable of determining a lateral pressing direction, such as a force sensor typically used as a tactile sensor, a lateral pressing input direction may be determined based on the detection values of one or more lateral pressing detection portions in which detection values have been generated during lateral pressing.

An input direction can be determined through the above-described process regardless of whether a reference location has been set or not.

Detecting the tilt pressing input direction is performed in the same manner as described above in regard to the lateral pressing input.

With regard to vertical pressing input, when a reference location is set, vertical pressing detection portions may be located in a plurality of directions around the reference location. When a reference location is not set, a vertical pressing input direction may be determined based on a contact area. Accordingly, a user can perform vertical pressing input by vertically pressing a finger at any location in an input region.

With regard to tilt input, the input direction thereof can be determined based on the change in initial contact area attributable to the tilting of a finger. Accordingly, with regard to the tilt input, a tilt input direction can be determined regardless of whether a reference location has been set or not.

The above-described configuration of the detection portions and the above-described signal processing methods for the above-described directional input methods are only examples, and a larger variety of methods of detecting the first to fourth directional inputs based on finger actions according to the present invention, that is, lateral pressing input, vertical pressing input, tilt pressing input and tilt input, may be more various. Accordingly, although a person having ordinary skill in a field identical to that of the data input device of the present invention uses the configuration of a detection portion and a signal processing method that are not presented in the present invention, it should be considered that the configuration of the detection portion and the signal processing method fall within the scope of the present invention as long as the configuration of the detection portion and the signal processing method, which are not presented in the present invention, can be easily implemented in order to produce the same directional input results as the directional input mechanism of the present invention.

Although lateral pressing input, vertical pressing input, tilt pressing input and tilt input are separately performed, and thus data assigned to respective inputs for predetermined directions can be input, the respective inputs can be performed successively and, therefore, the data assigned to the respective inputs can be processed successively.

Here, the successive input will be described in more detail below. If lateral pressing input is performed by laterally pressing a finger in a predetermined direction, the flesh of the finger is pushed, and thus the location of the finger varies. In the case where an input region is made of soft elastic material, the pushing phenomenon can occur more easily by the input region. Accordingly, although the finger and the input region remain in contact with each other, the location of the finger moves spatially across the input region, with the result that, if vertical pressing is performed in the state in which lateral pressing is performed in a predetermined direction, the lateral pressing for the predetermined direction and the vertical pressing for the predetermined direction are input successively. For example, if vertical pressing is performed in a 3 o'clock direction in the state in which lateral pressing has been performed in a 12 o'clock direction, the 3 o'clock point of the vertical pressing varies from the reference location at which the vertical pressing is first performed. That is, the 3 o'clock point moves by a distance over which the lateral pressing has been performed.

However, in the present invention, even in this case, that is, even when later input is performed immediately after earlier input has been performed, the later input is recognized, and thus two or more inputs can be performed at the same time. Accordingly, even in the state in which lateral pressing input has been performed in a predetermined direction, vertical pressing input, tilt pressing input or tilt input can be performed in an arbitrary radial direction.

This successive input can be performed by, when lateral pressing input, vertical pressing input, tilt pressing input and tilt input are performed in a predetermined direction, determining a reference location that determines an input direction based on the contact area between a finger and an input region, setting the input location of earlier input as a reference location for later input, or causing a plurality of indication locations for later input to follow the input location of earlier input. Alternatively, this successive input can also be implemented using various methods.

For example, indication locations for later input may be determined using a point where lateral pressing input is terminated as a reference location.

This will be described below in more detail with reference to FIG. 46. Here, in FIG. 46, the reference location S and the indication locations P around the reference location are virtually indicated on the detection unit 30.

First, when a finger is first brought into contact with the detection unit 30, the center of the contact area is set as the reference location S and the indication locations P are generated around the reference location (①). Here, when lateral pressing input is performed in a 3 o'clock direction, data assigned to the lateral pressing input is input (②). Since the finger has been moved in the 3 o'clock direction, a reference location S and indication locations P are generated again based on the point where the finger is in contact with the detection unit 30.

At this time, data assigned thereto can be input successively by performing vertical pressing input in a 12 o'clock direction (③).

Meanwhile, the detection unit 30 can be provided in various shapes. For example, as shown on the right side of the casing 110 of FIG. 1, the detection unit 30 can have a circle shape. As shown on the left side of the casing 110 of FIG. 1, the detection unit 30 can have a square shape. It is apparent that the area of an input region can also be provided in various shapes as needed.

The detection unit 30 can further generate a central input signal to detect the pressing of the reference location S by a finger.

The central input signal is generated by the vertical pressing of the reference location S. When the central input signal is received, the control unit can process the received central input signal as central input, extract a character, a number, data or a functional instruction corresponding to the central input from a memory unit, and input it.

Meanwhile, the detection unit 30 can further generate a central detection signal to detect the placing of a finger on the reference location S.

The central detection signal is used to determine whether a finger comes into contact with the reference location S, and is distinguished from the central input signal for inputting data assigned to the reference location S by pressing the reference location S.

In other words, when the vertical pressing input PP is performed using a finger, the vertical pressing input PP may be performed by placing the finger on the reference location S or by directly pressing a vertical pressing location in the state in which the finger is spaced apart from the reference location S. The two types of input actions may be distinguished from each other using the central detection signal.

Accordingly, the control unit enables first data to be input when the central detection signal and a second directional input signal are generated at the same time (that is, in the case where vertical pressing is performed in the state in which the finger is placed on the reference location S), and enables second data to be input when only the second directional input signal is generated (that is, in the case where vertical pressing is performed in the state in which the finger is spaced apart from the reference location S).

Here, a keyboard display unit 81 for displaying data assigned to each of the lateral pressing direction and the vertical pressing location may be provided in either a display unit 123 or the detection unit 30. When the central detection function is provided, data assigned to the vertical pressing location may be converted and displayed depending on whether the central detection signal is generated or not.

The detection unit 30 may be provided in various forms. For example, the detection unit 30 may be provided in the form of a piezoelectric detection panel 40 that can be elastically deformed by pressing with a finger.

The piezoelectric detection panel 40 allows the value of output current or voltage to be changed according to the amount of external force when the external force is applied thereto. For example, Piezo sensors may be used as the piezoelectric detection panel 40, but the piezoelectric detection panel 40 is not limited thereto. That is, the piezoelectric detection panel 40 may be implemented using sensors that can be contracted or relaxed, and thus it causes a current value to be changed when being relaxed or contracted by pressing, for example, it generates a (−) value during relaxation and a (+) value during contraction. Alternatively, force sensors that are well known to those skilled in the art and can detect vertical force and lateral force may also be used.

When the piezoelectric detection panel 40 is implemented using sensors that cause the current value thereof to be changed by contraction and relaxation, whether the vertical pressing input PP, the lateral pressing input PM or the tilt pressing input PS has been performed at a corresponding location is determined using a location where the current value has been generated and the type of change in the current value by detecting the change in the current value attributable to the contraction and relaxation.

In other words, when, as shown in FIG. 14(b), vertical pressing is performed on the piezoelectric detection panel 40 shown in FIG. 14(a), there occurs a change in the current value at a corresponding vertical pressing location. Here, since the piezoelectric detection panel 40 has been contracted by the vertical pressing in FIG. 14(b), a (+) value is generated, in which case it is determined that the vertical pressing input PP has been performed at the vertical pressing location.

Furthermore, when lateral pressing is performed, the piezoelectric detection panel 40 is deformed as shown in FIG. 14(c). Here, the right side of the piezoelectric detection panel 40 is contracted, and thus a (+) value is generated; the left side of the piezoelectric detection panel 40 is relaxed, and thus a (−) value is generated. Accordingly, in this case, it is determined that the lateral pressing input PM toward the point where the (+) current value has been generated has been performed.

Further, when tilt pressing is performed, the piezoelectric detection panel 40 is tilted, as shown in FIG. 14(d). Thus, the right side of the piezoelectric detection panel 40 is depressed and contracted, and thus and a (+) value is generated; the left side of the piezoelectric detection panel 40 is tilted and relaxed, and thus a (−) value is generated. Accordingly, in this case, it is determined that the tilt pressing input PS toward the point where the (+) current value has been generated has been performed.

Meanwhile, when the detection unit 30 is provided in the form of the piezoelectric detection panel 40, the control unit, for example, may determine a lateral pressing direction or a vertical pressing location based on the location of the piezoelectric detection panel 40 at which an output value has been changed, and may determine whether lateral pressing or vertical pressing has been performed based on the degree of change in the output value.

For example, the control unit may determine that a finger has been placed on the piezoelectric detection panel 40 if pressing force detected in the piezoelectric detection panel 40 is equal to or greater than a set value and lower than 3 times the set value, may determine that pressing is the lateral pressing input PS if pressing force detected in the piezoelectric detection panel 40 is equal to or greater than 3 times and lower than 7 times the set value, and determine that pressing is the vertical pressing input PP if pressing force detected in the piezoelectric detection panel 40 is equal to or greater than 7 times the set value.

In other words, input that applies pressing force equal to or lower than a set pressure may be determined to be lateral pressing, and input that applies pressing force equal to or higher than a set pressure may be determined to be vertical pressing. In other words, input is determined based on the difference in the pressure value attributable to lateral pressing and vertical pressing. Since the pressing force of the lateral pressing in a vertical direction is smaller than that of the vertical pressing in a vertical direction, this is used.

Here, the multiple of the set value may be changed variously as needed.

Alternatively, whether lateral pressing or vertical pressing has been performed and a lateral pressing direction and a vertical pressing location may be simultaneously determined based on a location where pressing force has been generated around the reference location S.

For example, as shown in FIG. 10(a), when pressing force is detected in a radial direction in the state in which contact with the finger has been detected at the reference location S, the control unit may determine the contact to be the lateral pressing input PS. When pressing force is detected in a radial direction in the state in which contact with the finger has not been detected at the reference location S, the control unit may determine the contact to be the vertical pressing input PP.

Here, one or more of the first directional input signal, the second directional input signal and the central input signal may be classified as two or more multi-stage signals depending on the intensity of pressing force, and be then generated.

That is, by subdividing the output range of each signal value generated by the detection unit 30, the input signal is classified as one of two or more multi-stage signals depending on the size of an output value and is then input, when the same first directional input signal is received.

Accordingly, since the amount of data assigned to each lateral pressing direction or each vertical pressing location can be increased by the number of multi-stage inputs, the capacity of input can be maximized.

Meanwhile, the detection unit 30 further includes a rotation detection portion 85 having a ring shape, as shown in FIG. 9. The rotation detection portion 85 is spaced apart from the reference location S at a predetermined interval, and enables a 3D object to rotate and move on a 2D plane around the reference location S when the 3D object to be described later is manipulated.

The control unit (not shown) determines the lateral pressing direction or vertical pressing location of a finger based on the first directional input signal and the second directional input signal, extracts data assigned to a corresponding radial direction and a corresponding pressing location from a memory unit (not shown), and inputs the extracted data.

Data input by the lateral pressing or vertical pressing can be various types.

For example, in the case where characters, such as Korean characters, English characters, numbers and symbols, are assigned to a lateral pressing direction or vertical pressing location and the control unit receives the first directional input signal or the second directional input signal, corresponding characters assigned to the lateral pressing direction or the vertical pressing location may be extracted from the memory unit and be then input.

In this case, the respective characters may be arranged in various ways as needed. For example, consonant characters may be input by the lateral pressing, vowel characters may be input by the vertical pressing, the Korean characters may be input by the lateral pressing, and numbers and symbols may be input by the vertical pressing.

Furthermore, a first character assigned to the lateral pressing and a second character assigned to the vertical pressing may be input almost at the same time by successively performing the lateral pressing input and the vertical pressing input. In greater detail, in the state in which the lateral pressing has been performed in any one of a plurality of lateral pressing directions around a reference location, the vertical pressing input may be performed in any one of a plurality of vertical pressing locations around the reference location. In other words, in the state in which any one input of the lateral pressing and the vertical pressing has been performed in any one of a plurality of directions, the other input of the lateral pressing and the vertical pressing may be performed in any one of the plurality of directions. Accordingly, the first character and the second character based on the lateral pressing and the vertical pressing may be input successively and simultaneously, thereby enabling rapid input.

As described above, the lateral pressing and the vertical pressing are performed at the same time. Thus, in the case where switching to a mouse or joystick mode is performed, the movement of a mouse pointer or a game character moving function of a joystick may be performed by the lateral pressing, dragging and file dragging may be performed by the vertical pressing using the left and right buttons of the mouse, or, when a game is played, an attack command may be executed by the vertical pressing while characters are moved by the lateral pressing. That is, in a game, the game character manipulation function of a joystick may performed in such a way that, by performing two or more directional inputs at the same time, characters are moved and various command keys are executed. For example, changing eyesight while running a character and running while shooting a gun run can be performed.

Alternatively, in a graphic task mode for a 3D object implemented on a computer, the movement of the 3D object can be performed by the lateral pressing, and a function of rotating the object in a vertical pressing direction can be performed by the vertical pressing.

Here, the rotation of the 3D object refers to that, in the state in which the object is fixed at a predetermined location on 3D coordinates, the object is rotated without moving. Such rotation is distinguished from rotation movement in a 2D plane by the rotation detection portion 85.

Meanwhile, the input device of the present invention can input a third character, other than the characters assigned to the lateral pressing and the vertical pressing, through combinational input of the lateral pressing and the vertical pressing. For example, in the case where 'ㄱ' is input by a lateral pressing input $PM_1$ in a 12 o'clock direction and 'ㅏ' is input by a vertical pressing input $PP_1$ in a 12 o'clock direction, a symbol '@', other than 'ㄱ' or 'ㅏ', may be input by combinational input of lateral pressing and vertical pressing in the 12 o'clock direction. In other words, by successively performing the vertical pressing input $PP_1$ in the 1 o'clock direction, as shown in FIG. 12(b), in the state in which the lateral pressing input $PM_1$ in the 1 o'clock direction is performed, as shown in FIG. 12(a), a character different from those of the individual lateral pressing input and the individual vertical pressing input can be input. It is also to be understood that, in the state in which the vertical pressing input has been first performed, the lateral pressing input may be performed. In this case, a character different from that of the case where the lateral pressing input and the vertical pressing input are successively input can be input.

Such distinguishing the combinational input and the individual input (lateral pressing input or vertical pressing input) from each other may be performed using various methods, such as a method of determining input under consideration to be the combinational input in the case where vertical pressing is detected within a predetermined time value in the state in which lateral pressing has been performed (or vice versa), or a method of determining whether the combinational input has been performed based on a pressure value detected in lateral pressing or vertical pressing.

Furthermore, a moving portion corresponding to the lateral pressing and a pressing portion corresponding to the vertical pressing may be separately provided, thereby enabling the lateral pressing and the vertical pressing to be input successively or in a combination.

Furthermore, the input device of the present invention may be provided as one set or two sets. In addition, each of the lateral pressing and the vertical pressing may be provided to enable multi-stage input. Furthermore, it is possible to perform input while distinguishing the case where, in the state in which a central detection signal has been input using a central detection signal, the lateral pressing or the vertical pressing is performed and the case where, in the state in which the central detection signal has not been input, the lateral pressing and the vertical pressing are performed from each other.

In addition, the number of characters that can be input to the input device according to the present invention can be increased as desired, using a method using a two-set input device, multi-stage input and a central detection signal. Accordingly, in the state in which one of the Korean alphabet, the English alphabet and the Hiragana has all been arranged, numbers and symbols may also be further assigned, thereby enabling rapid input.

Meanwhile, the reference location S may be fixed to one side of the input region, but may be moved according to the contact location of a finger placed on the detection unit 30, as shown in FIG. 10(b). In this case, the vertical pressing location may also be moved along with the reference location S.

That is, although a finger coming into contact with the piezoelectric detection panel 40 is moved and the reference location S is changed from S1 to S2, the vertical pressing location is moved along with the reference location S. Accordingly, vertical pressing may be performed right at the moved reference location S2 without the need to return to the original reference location S1 for the purpose of vertical pressing.

In this case, in a mouse or joystick mode, the movement of a mouse pointer or the movement of game characters of a joystick may be performed by the movement of the contact point of a finger, and the left and right button manipulation function of the mouse or the game character manipulation function of the joystick may be performed by the vertical pressing.

In a similar way, in the graphic work for a 3D object, the movement of the object may be performed by the movement of the contact point of the finger, and a function of rotating the object in a vertical pressing direction may be performed by the vertical pressing.

Meanwhile, the lateral pressing and the vertical pressing through the above detection unit 30 may also be implemented on a typical touch screen.

Meanwhile, a cover member 50 made of elastic material may be further provided over the detection unit 30 on which a finger is placed, as shown in FIG. 7.

The cover member 50 is provided to surround the detection unit 30, and functions to prevent the detection unit 30 from being worn, damaged, etc. and also dust, water, etc. from being introduced into the detection unit 30.

Here, the cover member 50 is interposed between a finger and the detection unit 30, but does not distinguish the lateral pressing and the vertical pressing. Accordingly, the cover member 50 does not perform a function, such as that of typical input means.

The cover member 50 may be closely attached to the detection unit 30 such that they cannot be moved relative to each other.

Sliding prevention means 51 for preventing a finger from sliding during the lateral pressing may be further provided on the cover member 50.

The sliding prevention means 51 may be provided in various ways. For example, the cover member 50 may be made of material, such as rubber having great friction force, and protrusion and depressions may be formed on the cover member 50.

Meanwhile, display means 55 for displaying a lateral pressing direction for the each lateral pressing input PM and a vertical pressing location for the each vertical pressing input PP may be further provided on the cover member 50, as shown in FIG. 8(b).

The display means 55 may display the lateral pressing direction and the vertical pressing location and also display data, such as a character and a number assigned to the lateral pressing direction or the vertical pressing location.

Furthermore, a pressing projection 53 for concentrating pressing force during the vertical pressing may be further provided at the each vertical pressing location. The pressing projection 53 locally concentrates elastic deformation caused by pressing force during the lateral pressing input PM or the vertical pressing input PP, thereby increasing a change in an output value. Consequently, the piezoelectric detection panel 40 may detect the lateral pressing input PM and the vertical pressing input PP effectively.

Hereinafter, detailed embodiments of the present invention will be described with reference to the accompanying drawings.

FIG. 3 is a sectional view showing the detection unit 30 according to an embodiment of the present invention.

Referring to the drawing, the detection unit 30 includes a first piezoelectric detection panel 41 having a concave input region corresponding to the shape of the contact surface of a finger.

Referring to FIG. 3(a), in the state in which a plurality of vertical pressing locations or a plurality of lateral pressing directions are sequentially spaced apart from a reference location S, which is located at the center of the contact surface of a finger, at irregular intervals, the vertical pressing locations or the lateral pressing directions are arranged in a radial direction in the first piezoelectric detection panel 41.

That is, the vertical pressing locations for detecting the vertical pressing input PP of the finger are disposed outside the center of the first piezoelectric detection panel 41 where the reference location S is located, and the lateral pressing directions for detecting the lateral pressing input PM are disposed outside the vertical pressing locations.

In other words, the first piezoelectric detection panel 41 is concaved in accordance with the shape of the contact surface of the finger, so that the lateral pressing directions are disposed at locations where the finger is pressed in a lateral direction and the vertical pressing locations are disposed at locations where the finger is tilted and pressed downward.

In this case, the vertical pressing locations, the lateral pressing directions or the vertical pressing locations and the lateral pressing directions may be divided and partitioned by deformation prevention grooves 57.

Meanwhile, the plane shape of the first piezoelectric detection panel 41 may be provided, as shown in FIG. 7(b).

Meanwhile, the first piezoelectric detection panel 41 (41a, 41b and 41c) may be partitioned and provided in accordance with the respective lateral pressing directions and the respective vertical pressing locations in the casing 110 having a concave shape, as shown in FIG. 3(b).

Here, reference numeral 41a denotes the first piezoelectric detection panel 41 for detecting the lateral pressing input PM, 41b denotes the first piezoelectric detection panel 41 for detecting the vertical pressing input PP, and 41c denotes the first piezoelectric detection panel 41 for detecting a central pressing pressure PC toward the reference location S.

FIG. 4 is a sectional view showing the detection unit 30 according to another embodiment of the present invention.

Referring to the drawing, the detection unit 30 may include a second piezoelectric detection panel 42 that detects the vertical pressing and generates the second directional input signal, and a third piezoelectric detection panel 43 that is provided under and in contact with the second piezoelectric detection panel 42, and is configured to detect the pushing of the second piezoelectric detection panel 42, which comes into contact during the lateral pressing, and generate the first directional input signal.

That is, the vertical pressing input PP is detected through the second piezoelectric detection panel 42 located on the upper side, and the lateral pressing input PM is detected by pushing in the third piezoelectric detection panel 43, which comes in contact with the second piezoelectric detection panel 42 by the pressing force of the finger.

FIG. 5 is a sectional view of the detection unit 30 according to still another embodiment of the present invention.

Referring to the drawing, the detection unit 30 may include a fourth piezoelectric detection panel 44 that comes into contact with a finger and is configured to detect the vertical pressing input PP and generate the second directional input signal, a plurality of vertical projections 37 that protrude downwardly from the fourth piezoelectric detection panel 44, and first moving detection portions 31 that are provided in respective lateral pressing directions around the respective vertical projections 37 and are configured to come into contact with the vertical projections 37 or be pressed during the lateral pressing input PM and generate the first directional input signal.

A finger is placed on the fourth piezoelectric detection panel 44, and the fourth piezoelectric detection panel 44 is provided to detect the vertical pressing input PP.

The vertical projections 37 protrudes downwardly from the fourth piezoelectric detection panel 44 and are moved in a lateral direction when the fourth piezoelectric detection panel 44 is pushed by the pressing force during the lateral pressing input PM. The vertical projections 37 come into contact with the first moving detection portions 31 or are pressed, and detect the lateral pressing input PM.

The vertical projections 37 and the first moving detection portions 31 may be provided only at the reference location S, or a plurality of vertical projections 37 and first moving detection portions 31 may be distributed throughout the input region.

In the latter case, even in the case where the reference location S is moved, the lateral pressing input PM can be performed at various locations.

FIG. 6 is a sectional view of the detection unit 30 according to further still another embodiment of the present invention.

Referring to the drawing, the detection unit 30 includes a fifth piezoelectric detection panel 45 that has a through hole 38 at the reference location S and is configured to detect the vertical pressing input PP and generate the second directional input signal, and a second moving detection portions 32 that is inserted into the through hole 38, is provided to be tilted in the each radial direction by the finger and is configured to generate the corresponding first directional input signal during the lateral pressing input PM.

In the second moving detection portion 32, a method of detecting the lateral pressing input PM is not limited. For example, the second moving detection portion 32 may detect the lateral pressing direction through the relaxation or contraction of one lower side thereof while it is tilted by the pressing force, and detect contact with the fifth piezoelectric detection panel 45 or pressing force while it is tilted by the pressing force.

FIG. 7 is a sectional view of the detection unit 30 according to further still another embodiment of the present invention.

Referring to FIG. 7(a), the detection unit 30 includes sixth piezoelectric detection portions 46 and seventh piezoelectric detection portions 47.

The sixth piezoelectric detection portions 46 may be disposed at different intervals around the reference location S in band form, as shown in FIG. 7(b). Each of the sixth piezoelectric detection portions 46 detects the vertical pressing input PP, and generates the second directional input signal.

The seventh piezoelectric detection portion 47 is disposed between the respective sixth piezoelectric detection portions 46, and has a height lower than that of the sixth piezoelectric detection portions 46 in such a way as not to be pressed by a finger during the vertical pressing input PP. The seventh piezoelectric detection portion 47 is pressed in a lateral pressing direction by the sixth piezoelectric detection portions 46 during the lateral pressing input PM, and generates the first directional input signal.

Here, the height of the seventh piezoelectric detection portion 47 may vary in various ways. However, it is preferred that, although the sixth piezoelectric detection portions 46 are pressed by the vertical pressing input PP, the height of the seventh piezoelectric detection portion 47 be lower than a height that can prevent the pressing force of a finger or the cover member 50 from being transferred thereto.

Meanwhile, during the lateral pressing input PM, the pressing force is transferred to the seventh piezoelectric detection portion 47 by the sixth piezoelectric detection portions 46 located at the reference location S, so the first directional input signal in a corresponding lateral pressing direction is generated.

Meanwhile, as shown in FIG. 7(c), a conductive elastic member 65 may be interposed between the sixth piezoelectric detection portions 46 and the seventh piezoelectric detection portion 47.

In this case, one end of each of the piezoelectric detection units 46 and 47 is electrically connected to the control unit through the conductive elastic member 65, and the other end of each of the piezoelectric detection units 46, 47 is electrically connected to the control unit through a terminal 61 provided on the circuit board 115.

Meanwhile, FIG. 11 shows a construction in which the embodiment shown in FIG. 5 and the embodiment shown FIG. 7 are combined together. A vertical projection 37*a* generates the first directional input signal by pressing a seventh piezoelectric detection portion 47*a* during the lateral pressing input PM in the left direction. A vertical projection 37*b* generates the first directional input signal by pressing a seventh piezoelectric detection portion 47*b* during the lateral pressing input PM in the right direction. In a similar way, a vertical projection 37*c* generates the first directional input signal during the lateral pressing input PM in a forward direction (a direction in which the vertical projection 37*c* passes through the surface), and a vertical projections 37*d* generates the first directional input signal in a backward direction (a direction in which the vertical projection 37*c* passes through the surface upwards).

FIG. 8 is a sectional view of the detection unit 30 according to further still another embodiment of the present invention.

Referring to the drawing, the detection unit 30 includes an eighth piezoelectric detection panel 48 that comes into contact with a finger and is configured to detect the vertical pressing input PP and generate the second directional input signal, and third moving detection portions 33 that are provided outside the eighth piezoelectric detection panel 48 and are configured to detect contact by the pushing of the eighth piezoelectric detection panel 48 during the lateral pressing input PM and generate the first directional input signal.

Here, the vertical pressing location can be provided in the third moving detection portion 33, as shown in FIG. 8(*b*), but can be provided in the eighth piezoelectric detection panel 48 in the same manner as in the lateral pressing direction.

Meanwhile, the pressing projection 53 may be integrally provided with the display means 55 in the case of the vertical pressing input PP, and may be provided between the eighth piezoelectric detection panel 48 and the third moving detection portion 33 in the case of the lateral pressing input PM.

Meanwhile, FIGS. 8(*c*) and (*d*) show the shape of the terminal 61 provided under the eighth piezoelectric detection panel 48. The terminal 61 may be provided in various types. As illustrated in (c), the terminal 61 may be provided in lattice-shaped matrix form, and determine a lateral pressing or vertical pressing location based on the X and Y coordinates of the location at which a current value or a voltage value has been output. As illustrated in (d), a plurality of terminal 61 may be distributed at respective locations of the input region.

FIG. 9 is a sectional view of a detection unit 30 according to further still another embodiment of the present invention.

Referring to the drawing, the detection unit 30 includes a ninth piezoelectric detection panel 49 that comes into contact with a finger and is configured to detect the vertical pressing input PP and generate the second directional input signal, and fourth moving detection portions that are provided in the ninth piezoelectric detection panel 49 in accordance with the respective radial direction on the basis of the reference location S and are configured to detect contact by the pushing of the ninth piezoelectric detection panel 49 during the lateral pressing input PM and generate the first directional input signal.

The fourth moving detection portions 34 may be, for example, provided within the ninth piezoelectric detection panel 49 and detect lateral pressing force by the pushing of the ninth piezoelectric detection panel 49 during the lateral pressing input PM.

The fourth moving detection portions 34 may be various in number. For example, as shown in FIG. 9, the fourth moving detection portions 34 may be provided in the lateral pressing directions, respectively.

FIG. 15 is a plan view of a detection unit 30 according to further still another embodiment of the present invention.

Referring to the drawing, as shown in FIG. 15(*a*), the detection unit 30 generates the first directional input signal by the vertical pressing input PP in the vertical pressing location, and generates the second directional input signal by the lateral pressing input PM at the lateral pressing location. At this time, the lateral pressing input PM is performed as a lateral pressing detection unit 66 provided in ring form outside the elastic member 65 is pressed while the elastic member 65 of the detection unit 30 is deformed by pressing force.

In addition, the elastic member 65 may be provided on the detection unit (not shown) that detects the vertical pressing input PP, but may have a structure in which the elastic member itself detects the vertical pressing input PP.

Meanwhile, as shown in FIG. 15(*b*), the detection unit 30 may include detection units 67 provided at the bottom of the elastic member 65 or within the elastic member 65. In this case, in the detection unit 30, the elastic member 65 is deformed by the vertical pressing input PP in the vertical pressing location, and such deformation is detected by the detection portions 67, so that the vertical pressing input PP is performed.

Furthermore, since the elastic member 65 is deformed by the lateral pressing input PM in the lateral pressing direction, and such deformation is detected by the detection portions 67, so that the lateral pressing input PM is performed.

Second Embodiment

A data input device according to a second embodiment of the present invention is provided in a predetermined input region of a terminal for an electronic device, and includes a detection unit 30 and a control unit (not shown).

In greater detail, the detection unit 30 detects a reference location S, which is displayed by the contact or pressing of a finger on the input region in the input region, and lateral pressing input PM and vertical pressing input PP at a plurality of first indication locations P, which is disposed and displayed around the reference location S, and generates a first directional input signal corresponding to the lateral pressing input PM and a second directional input signal corresponding to the vertical pressing input PP.

Here, the reference location S is displayed in the input region by the contact or pressing of a finger, but may be provided in the state in which the reference location S is displayed on the input region.

In addition, the detection unit 30 may employ detection means such as a touch pad, a touch screen or a piezoelectric detection panel. Furthermore, in the case where the touch pad or the touch screen detects only contact or lateral pressing, the piezoelectric detection panel may be used along with the touch pad or the touch screen.

The input of data to the detection unit 30 may be executed in the entire input mode (refer to FIG. 16(*b*)) in which the lateral pressing input PM and the vertical pressing input PP are performed on one of the first indication locations P in the state in which a finger is placed on the detection unit 30 (refer to FIG. 16(*a*)), and a partial input mode (refer to FIG. 16(*c*)) in which the lateral pressing input PM and the vertical pressing input PP are performed on one of the first indication locations P.

Here, the entire input mode and the partial input mode may be distinguished by detecting the area of contact with the detection unit 30 and determining whether the contact area is smaller than a predetermined area.

In greater detail, when a finger comes into contact with almost the entire surface of the detection unit 30, as shown in FIG. 17(a), it may be determined to be the entire input mode, and when a finger comes into contact with only a part of the detection unit 30, as shown in FIG. 17(b), it may be determined to be the partial input mode. Here, the boundary of the contact area to distinguish the entire input mode and the partial input mode is not specifically limited. That is, the boundary of the contact area may be determined depending on the size of the detection unit 30, the number of first indication locations P disposed in the detection unit 30 and so on. For example, the entire input mode and the partial input mode may be distinguished depending on whether the area of contact with the detection unit 30 is 30% or more.

Furthermore, in the case where the detection unit 30 is formed in the input region and detection portions 67 that detect the contact of a finger at the first indication locations on the detection unit are constructed, as shown in FIG. 17(c), the entire input mode and the partial input mode may be performed by detecting the contact of the finger placed on the detection unit 30 in the detection portions 67. For example, when the contact of the finger is detected in two or more of the detection portions 67, it may be determined to be the entire input mode.

As described above, if the entire input mode and the partial input mode are distinguished from each other, input by the lateral pressing and the vertical pressing at each of the first indication locations P in the entire input mode and input by the lateral pressing and the vertical pressing at each of the first indication locations P in the partial input mode may be distinguished from each other. Accordingly, if a total of eight pieces of data may be input in the partial input mode because there are four first indication locations in the detection unit 30, eight different data may be input through the entire input mode, thereby doubling the data input capacity.

Meanwhile, the detection unit 30 may generate a third directional input signal as tilt pressing input PS by tilt pressing. That is, when lateral pressing and vertical pressing on the detection unit 30 are detected at the same time within a set time range, the detection unit 30 may generate the third directional input signal corresponding to the tilt pressing input PS, and the control unit may process third data different from the lateral pressing input PM and the vertical pressing input PP.

For example, in the case where, as shown in FIG. 18, 'ㄴ' is assigned to lateral pressing (① of FIG. 18) at the first indication location in a 1 o'clock direction and 'ㅗ' is assigned to vertical pressing (② of FIG. 18) at the first indication location in a 1 o'clock direction, 'ㅍ', other than 'ㄴ' or 'ㅗ', may be assigned to tilt pressing (③ of FIG. 18) at the first indication location in a 1 o'clock direction.

This tilt pressing input PS may be performed in various ways, as shown in FIG. 19. In other words, this tilt pressing input PS may be performed by performing vertical pressing in the state in which lateral pressing is performed, as shown in FIG. 19(a), and may be performed by performing lateral pressing in the state in which vertical pressing is performed, as shown in FIG. 19(b). Furthermore, the tilt pressing input PS may be performed by increasing pressure in a downward diagonal direction, as shown in FIG. 19(c), and may be performed by decreasing a first applied pressure in an upward diagonal direction, as shown in FIG. 19(d).

At this time, if this tilt pressing is performed in such a way as to be pushed upwards, as shown in FIG. 19(d), contraction will be generated in the pushed direction and a contracting pressure value will be generated, and a relaxation value will be generated in a direction opposite to the pushed direction and upward diagonal tilting will be generated. Alternatively, as shown in FIG. 19(d), an upward detection unit 35 that is able to detect pushing up may be provided so as to detect upward diagonal tilting.

A pressure change for the tilt pressing input PS may be detected by a piezoelectric detection panel or the like. It is preferred that the detection unit 30 be made of elastic material so that various tilt pressing input (PS) operations may be performed easily.

Data input by this lateral pressing, vertical pressing and tilt pressing are described by way of examples.

In the detection unit shown in FIG. 18, 'ㄴ' is input by the lateral pressing input (PM, ① of FIG. 18) at the first indication location in the 1 o'clock direction, 'ㅗ' is input by the vertical pressing input (PP, ② of FIG. 18) at the first indication location P in the 1 o'clock direction, and 'ㅍ' is input by the tilt pressing input (PS, ③ of FIG. 18) at the first indication location P in the 1 o'clock direction. Accordingly, a character '푯' may be input by successively performing them.

Here, each input may be distinguished by not only a location where the input is performed, but also the pressure value of the input and the time interval between inputs.

In this distinguishing based on the pressure value, when the pressure value for the first indication location P is 30 or less, it may be determined to be the lateral pressing input PM, when the pressure value for the first indication location P is 50 or more, it may be determined to be the vertical pressing input PP. Accordingly, if 20 is added to the pressure value in the state in which the lateral pressing input PM is performed, it becomes the vertical pressing input PP, so that it may be understood that the lateral pressing input PM and the vertical pressing input PP are performed successively.

Furthermore, although 50, that is, a pressure value corresponding to the vertical pressing, is added in the state in which the lateral pressing input PM is performed, it may be understood that the lateral pressing input PM and the vertical pressing input PP are performed successively.

Here, if the lateral pressing input (PM, refer to FIG. 20(a)) and the vertical pressing input (PP, refer to FIG. 20(b)) that are successively performed are successively performed within a predetermined time range, as shown in FIG. 20, it may be determined to be the tilt pressing input PS, other than the lateral pressing input and the vertical pressing input. That is, the tilt pressing input PS is a type in which lateral pressing and vertical pressing are combined together. In the case where the lateral pressing and the vertical pressing are performed within a set time range, it is determined to be the tilt pressing input, other than the lateral pressing input or the vertical pressing input, data ('ㅍ', that is, the 1 o'clock direction input of FIG. 18) different from that of the lateral pressing input ('ㄴ', that is, the 1 o'clock direction input of FIG. 18) or that of the vertical pressing input ('ㅗ', that is, the 1 o'clock direction input of FIG. 18) may be input.

In addition, the lateral pressing input PM, the vertical pressing input PP and the tilt pressing input PS may be combined and input. In other words, the lateral pressing input PM and the tilt pressing input PS may be combined and input as new data as shown in FIG. 21(a), and the tilt pressing input PS and the vertical pressing input PP may be combined and input as new data as shown in FIG. 21(b). Furthermore, the lateral pressing input PM and the vertical pressing input PP may be combined and input as new data, as shown in FIG. 21(c), and the lateral pressing input PM, the vertical pressing input PP and the tilt pressing input PS may be combined and input as new data, as shown in FIG. 21(d).

Furthermore, in the detection unit 30, a second indication location P2 may be disposed at the each first indication location P1 in a radial direction. Here, data assigned to lateral pressing and vertical pressing in the each second indication location P2 may also be input at the second indication location P2 by lateral pressing and vertical pressing.

As described above, the first indication locations P1 and the second indication locations P2 are arranged around the reference location S, thereby enabling more various inputs. In other words, input by motion in the first indication location (P1) direction for the entire detection unit 30 may be performed, as shown in FIG. 22(a), lateral pressing input and vertical pressing input at each first indication location P1 may be performed, as shown in FIG. 22(b), and, although not shown, tilt pressing input at the each first indication location P1 may be performed. Furthermore, as shown in FIG. 22(c), lateral pressing input from the each first indication location P1 to the each second indication location P2 may also be performed along with the lateral pressing input to the each first indication location P1.

Moreover, as shown in FIG. 22(d), vertical pressing input to the each first indication location P1 and lateral pressing input from the each first indication location P1 to the each second indication location P2 may be also be performed. Furthermore, as shown in FIG. 22(e), lateral pressing input to the first indication location P1 and lateral pressing input from the each first indication location P1 to a cylindrical direction may also be performed.

Furthermore, as shown in FIGS. 23(a) to (c), lateral pressing inputs at the respective first indication locations P1 may be performed in various forms. In other words, lateral pressing input may be performed by lateral pressing at the each first indication location, as shown in FIG. 23(a), lateral pressing input may be performed from the each first indication location to an inward or outward direction in a radial direction, as shown in (b) of FIG. 23, and input by lateral pressing from the each first indication location to a cylindrical direction may be performed, as shown in FIG. 23(c).

The determination of whether it is input at a predetermined first indication location P1 and a predetermined second indication location P2 is performed by detecting a point where vertical pressing is generated because some vertical pressing is generated during lateral pressing input and determining the first indication location P1 and the second indication location P2 corresponding to the point.

In addition, in order to facilitate the various inputs at the first indication locations P1 and the second indication locations P2, elastic members 65 may be formed at each first indication location P1 or each second indication location P2 to protrude.

For example, the elastic members 65 that are transparent may be formed on the touch screen so that they protrude therefrom in predetermined form, as shown in FIG. 24, thereby improving the transfer of the pressing of a finger or the manipulation performance of a finger.

Furthermore, in the input region such as the touch screen, the elastic member 65 having a circular shape may be provided at the reference location S and the elastic members 65 having a ring shape, which are spaced apart from each other in a radial direction around the reference location S, may be provided to protrude, as shown in FIG. 25. In this case, the lateral pressing input PM may be enabled for the reference location, and the lateral pressing input PM and the vertical pressing input PP may be enabled for the first indication locations provided in the ring-shaped elastic members 65.

Furthermore, the above various inputs may also be implemented on a general touch screen. That is, a detection portion that is able to detect lateral pressing and vertical pressing may be provided under the touch screen so that the each input may be performed.

Alternatively, the input may be performed on a touch screen itself that is able to detect lateral pressing and vertical pressing. Since The touch screen that is able to detect the lateral pressing and the vertical pressing is known to those having ordinary skill in the art, a detailed description of a method of implementing lateral pressing and vertical pressing through the touch screen is omitted here.

Meanwhile, the detection unit 30 in the present embodiment is constructed to include a reference location and first indication locations within a range of one finger, so input at each indication location may be performed easily through an input mechanism portion 87. That is, as shown in FIG. 26, lateral pressing and vertical pressing at a predetermined first indication location may be transferred to the detection unit more smoothly through the input mechanism portion 87 made of elastic material.

Furthermore, this input mechanism portion 87 may be formed in sheet form, as shown in FIG. 27(a), and a projection 87a may be formed at a portion corresponding to the each first indication location in the sheet form, thereby facilitating an input at the each first indication location. This input mechanism portion 87 is not limited to a circular shape, but may be provided in a shape corresponding to the shape of the detection unit 30. That is, in the case where the detection portion of the detection unit 30 is provided in a ring shape, as shown in FIG. 27(b), the input mechanism portion 87 may also have a ring shape.

Meanwhile, the input mechanism portion 87 has a sheet shape, as shown in FIG. 28(a), and may have a projection 87a corresponding to the each first indication location on the side opposite to that of FIG. 28(a). This helps a minute input with respect to each input mechanism portion 87 when input at the each first indication location is performed using a finger placed on the input mechanism portion 87.

In addition, the input mechanism portion 87 is not limited to a circular shape, but may have a ring shape depending on the shape of the detection portion of the detection unit 30, as shown in FIG. 28(b).

Here, although the projections 87 shown in FIGS. 27 and 28 are formed at radial four locations of the input mechanism portion 87, they may be formed at radial eight locations in such a way as to correspond to eight first indication locations such as in FIGS. 12, 18, 21 and 25.

Further, the input mechanism portion 87 may be formed with it suspended by a string 87b, as shown in FIG. 47. Here, the input mechanism portion 87 may include a projection 87a corresponding to a contact point 123a of a display unit 123.

Furthermore, the input mechanism portion 87 may be provided in the form of a slide bar that may slide toward the display unit 123, as shown in FIG. 48, and may be provided in a foldaway type in which the input mechanism portion 87 may come into contact with the display unit 123 with it folded in a flip form, as shown in FIG. 49. Here, FIGS. 48 and 49 may also include the projection 87a corresponding to the contact point 123a of the display unit 123.

Further, in the various input types as illustrated in FIG. 29, the same data group may be assigned to the four types of lateral pressing inputs PM with respect to the reference location S in FIG. 29(a) and the four types of lateral pressing inputs PM at the each first indication locations P1. As described above, if the same data group is assigned to the reference location and the first indication locations with respect to the detection unit 30 shown in FIG. 25, the lateral pressing input PM may be performed at an adjacent first indication location immediately after the lateral pressing input PM in a predetermined direction at the reference location is performed, thereby enabling rapid data input.

In a similar way, in FIG. 29(b), the same data group may be assigned to the reference location S and the first indication locations P1 in the detection unit 30, as shown in FIG. 22(d), thereby enabling rapid data input. In addition, FIG. 29(c) shows the case in which the same data group is assigned to the each first indication location P1 and data input is performed using the same method as described above.

Meanwhile, in the detection unit according to the present invention, each indication location is disposed within a range that can be covered with one finger. Thus, after the vertical pressing input PP or the lateral pressing input PM at one indication location, the vertical pressing input PP or the lateral pressing input PM at the other indication location may be performed rapidly. That is, after a vertical pressing input $PP_3$ is performed at an indication location in a 5 o'clock direction in the state in which a finger is placed on a hatched portion as shown in FIG. 35(a), a lateral pressing input $PM_7$ at an indication location in a 10 o'clock direction may be performed immediately.

Furthermore, as shown in FIG. 35(b), after a vertical pressing input $PP_3$ with respect to an indication location of a 5 o'clock direction is performed in the state in which the finger is placed on the hatched portion even in the detection unit as shown in FIG. 25, a lateral pressing input $PM_7$ may be performed at an indication location in a 10 o'clock direction.

Furthermore, if a finger is placed at a predetermined location on the touch screen as described above, a character input mode is activated, so that the detection unit 30 may be implemented on the touch screen. At this time, the keyboard is radially displayed around the finger and data input may be performed. When the finger is detached from the touch screen, the keyboard may disappear.

In addition, the detection unit 30, the predetermined location of which is activated, may be moved to another location in the input region in the state in which the finger is in contact with the detection unit, as shown in FIG. 34. Such location change is performed on the basis of a reference location and, when the reference location is moved, a first reference location is spaced apart from the reference location in a radial direction.

Further, although the first indication locations are illustrated as including four directions or eight directions in the present embodiment, the first indication locations are not limited to the above examples. The first indication locations may include five directions, six directions, seven directions or nine or more directions.

The above-described successive input may be utilized in various forms. For example, a mouse point may be moved increasingly or decreasingly according to the intensity of lateral pressing. Furthermore, the left and right button function or up and down scroll function of a mouse may be performed by vertical pressing (or tilt pressing). In addition, according to the present invention, in the state in which a finger is placed, the other input is performed in the state in which one input is performed. Accordingly, dragging or file dragging may be performed by performing lateral pressing and vertical pressing (or tilt pressing) at the same time.

Alternatively, when a game is played, the present invention enables the game character manipulation function of a joystick, such as using various instructions keys while moving characters.

Alternatively, lateral pressing may enable a mouse pointer to be moved, and the left button function of a mouse may be performed by pressing the reference location of the detection unit.

However, if the mouse pointer is moved only by lateral pressing or vertical pressing as described above, the mobility of the pointer is limited, and thus it is difficult to rapidly manipulate the mouse pointer during a game as in a desktop computer. That is, if the mouse pointer is moved symmetrically to a finger action in portable devices, the mouse pointer may be moved rapidly and minutely in response to the finger action. However, it is difficult to implement a mouse pointer manipulation method, similar to that in a desktop computer, due to limited space in portable devices.

Accordingly, if vertical pressing and lateral pressing, which can apply pressure to contact movement in which a finger and a mouse pointer are moved in response to each other, are used in combination, the speed of the mouse pointer may be controlled more while the mouse pointer is moved rapidly and minutely in response to the finger action. Consequently, the movement of the mouse pointer may be controlled effectively in a narrow space such as those of portable devices.

Furthermore, in order to control the mouse pointer more rapidly, it is preferred that the type of the movement of the finger be contact movement. However, if the location of the contact of the finger is moved, the finger deviates from a vertical pressing area, thereby making it difficult to perform the contact movement and the vertical pressing input at the same time. Accordingly, in the case where a finger is moved in a contact state as in the present embodiment, if the location of the detection unit may be changed according to the movement location of the finger, vertical pressing input may be always performed, even though the finger is moved to any location in a contact state.

As described above, the data input device of the present invention enables a mouse pointer to be moved more rapidly depending on the contact movement location of a finger even in a narrow input region and enables the detection unit, which may perform vertical pressing at a plurality of radial directions in a radial direction, to be moved according to the contact movement location of a finger. Accordingly, the data input device of the present invention may perform more instructions than the left and right buttons of a conventional mouse.

For example, when a game is played, the data input device of the present invention may move game characters by lateral pressing and perform an attack instruction by vertical pressing. That is, the data input device of the present invention may perform functions, such as changing an eyesight while making a character run by successively performing two or more inputs and making a character run while shooting.

Accordingly, a game character may be moved more rapidly and minutely, and a number of instructions may be executed along with the movement of the character. Accordingly, the present invention exhibits a significant excellent effect through a character manipulation method in portable devices.

Furthermore, in the graphic task mode for a 3D object implemented on a computer, the movement of the object may be performed by the lateral pressing, and a function of rotating the object in a vertical pressing direction or tilt pressing direction may also be performed by the vertical pressing or the tilt pressing.

Furthermore, pattern input may also be performed using two or more inputs at the same time. In particular, in character input, characters assigned to different inputs may be input at the same time, thereby enabling more rapid character input.

For example, '㎞' may be input through one action through successive ①, ② and ③ in FIG. 18, other than individual ①, ② and ③, thereby enabling more easy and rapid input.

Third Embodiment

Next, a third embodiment of the data input device according to the present invention is described.

The data input device according to the present embodiment, as shown in FIG. 30, includes an input portion 71, a detection portion 73, and a control unit (not shown). The input portion 71 is made of material which may be elastically deformed, and thus it is elastically deformed by lateral pressing, vertical pressing and tilt pressing at the first indication locations provided on the input portion and then presses the detection portion 73.

In addition, the detection portion 73 is provided across the lateral and bottom surfaces of the input portion 71, and detects lateral pressing, vertical pressing and tilt pressing on the input portion 71, respectively, and generates a first directional input signal for the lateral pressing, a second directional input signal for the vertical pressing and a third directional input signal for the tilt pressing.

In greater detail, the input portion 71 includes the lateral surface, the bottom surface, and an inclined surface between the lateral surface and the bottom surface. The detection portion 73 includes surfaces corresponding to the lateral surface, the bottom surface and the inclined surface of the input portion 71. Here, the detection portion 73 is provided with a lateral pressing detection portion 73a for detecting pressing on the lateral surface of the input portion 71, a vertical pressing detection portion 73b for detecting pressing on the bottom surface of the input portion 71, and a tilt pressing detection portion 73c for detecting pressing on the inclined surface of the input portion 71.

Further, the input portion 71 may have a lateral pressing projection 71a provided on a lateral surface, a vertical pressing projection 71b provided on a bottom surface, and a tilt pressing projection 71c provided on an inclined surface in order to certainly transfer the pressing to the lateral pressing detection portion 73a, the vertical pressing detection portion 73b and the tilt pressing detection portion 73c.

As described above, in the present embodiment, the input portion 71 and the detection portion 73 are provided with the constructions for inputting and detecting the tilt pressing separately from the lateral pressing and the vertical pressing. A method of distinguishing respective inputs when interference occurs between the inputs is to determine that the input is performed on a detection portion, which experiences the greatest pressing force, among the detection portions 73a, 73b, and 73c.

For example, although some pressing force is applied to the tilt pressing detection portion 73c when the lateral pressing input PM is performed on the input portion 71, it is detected as the lateral pressing input PM because most of the pressing force is detected in the lateral pressing detection portion 73a.

Furthermore, although some pressing force is also detected by the lateral pressing detection portion 73a and the vertical pressing detection portion 73b when the tilt pressing input PS is performed on the input portion, this is detected as the tilt pressing input PS because pressing force greater than the pressing force is detected by the tilt pressing detection portion 73c.

As described above, the first to third directional input signals are generated with respect to the lateral pressing input PM, the vertical pressing input PP and the tilt pressing input PS that are individually detected. The control unit extracts data, assigned to respective input signals based on the first to third directional input signals, from memory and inputs and processes the extracted data.

Even in this case, when the lateral pressing input PM, the vertical pressing input PP and the tilt pressing input PS are successively performed within a set time range, it may be determined to be combinational input so that data different from those of respective inputs may be input.

Fourth Embodiment

A fourth embodiment of a data input device according to the present invention is described below.

The data input device according to the present embodiment, as shown in FIG. 31, includes a detection unit having a number of detection lines and a control unit. The detection unit includes a reference plate 75 having first detection lines 75a arranged thereon and a moving plate 77 having second detection lines 77a arranged thereunder, which correspond to the first detection lines 75a. In this drawing, although the second detection lines 77a are illustrated as being arranged on the top of the moving plate 77, this illustration is given for ease of understanding. The second detection lines 77a are actually arranged on the bottom of the moving plate 77.

In this case, the respective detection lines 75a and 77a are arranged in parallel in one direction, as shown in FIG. 31(a). In addition, the moving plate 77 may be moved in a direction perpendicular to the detection lines 75a and 77a relative to the reference plate 75 while a finger is in contact with the moving plate 77. If the lateral pressing is performed by the finger while the finger is in contact with the moving plate 77 as described above, the moving plate 77 is moved relative to the reference plate 75 and, thus, the contact location between the first detection line 77a and the second detection line 75b, which were first brought into contact with each other, is changed.

That is, in the case where an nth first detection line 75a and an nth second detection line 77a are first brought into contact or face each other, the nth second detection line 77a comes in contact with an (n+x)th first detection line 75a while the moving plate 77 is moved by the lateral pressing. At this time, the "x" is a natural number such as 1, 2 or 3, and when the x value increases, it is meant that the moving plate has moved a lot. Accordingly, if data assigned to the first detection line 75a with which the nth second detection line 77a finally comes into contact is input depending on the intensity of lateral pressing on the moving plate 77, a multi-stage lateral pressing input is enabled.

In other words, as shown in FIGS. 31(b) and (c), the amount of motion of the moving plate 77 may vary depending on lateral pressing force, and various data inputs are possible accordingly.

Furthermore, the first detection line 75a and the second detection line 77a are in contact with each other or are detached from each other. Here, if vertical pressing is performed after a finger comes into contact with the moving plate 77, the vertical pressing input P is performed while the second detection line 77a presses the first detection line 75a.

In this case, several sheets of detection films connected to different input ports may be overlaid on each other on the moving plates 77, on the reference plates 75 or between the moving plate 77 and the reference plate 75 so that the vertical pressing may be increased in multi stages depending on the intensity of the vertical pressing. In addition, an insulating film may be further provided between the respective detection films, as in a membrane PCB method.

In addition, the first and second detection lines 75a and 77a may not be arranged at regular intervals, but are arranged irregularly so that a smaller number of the detection lines come into contact with each other when the reference plate 75 and the moving plate 77 cross each other.

FIG. 32 is a perspective view showing an example of the modification of the fourth embodiment according to the present invention.

As shown in FIG. 32(a), in the present example of modification, the first detection lines 75a and the second detection lines 77a are arranged in matrix form. Accordingly, lateral pressing on the moving plate 77 in a radial direction may be detected based on the contact between the first and second detection lines 75a and 77a. When the pressing force of the lateral pressing increases, new data may be input as the degree to which the second detection lines 77a are deviated from the first detection lines 75a to which the second detection lines 77a first correspond increases.

In addition, the second detection lines 77a provided in the moving plate 77c may have only a cross shape as shown in FIG. 32(b). Even if the second detection lines 77a have only a cross shape as described above, the deviation of the second detection lines 77a relate to the moving plate 77 by the lateral pressing may be detected using a method as shown in FIG. 32(a).

Furthermore, it is preferred that a return member (not shown) having elasticity be provided in the moving plate 77 such that the moving plate 77 returns to its original state after being moved by the lateral pressing of the moving plate 77.

FIG. 33 is a perspective view showing another example of the modification of the fourth embodiment according to the present invention.

In the present example of modification, a detection unit 30 is made of an elastic body. In the elastic body, a plurality of detection lines 78 is arranged in matrix form, so that, when the detection lines 78 are brought into contact with each other by lateral pressing and vertical pressing, a first directional input signal by the lateral pressing and a second directional input signal by the vertical pressing are generated.

In greater detail, the detection unit 30 is made of an elastic body, so that one side of the elastic body to which the lateral pressing is applied is contracted and the other side thereof is relaxed by the lateral pressing on the detection unit 30. Here, the plurality of detection lines 78 is provided in the elastic body in matrix form, so that neighboring detection lines come into contact with each other as the interval between the detection lines 78 is narrowed by the contraction of the elastic body. Accordingly, a lateral pressing direction may be determined by the contact of the detection lines 78 at the point where the detection lines 78 are contracted during the lateral pressing, and the degree of the contraction may be determined by the number of contacting detection lines 78.

Here, the number of detection lines 78 that are brought into contact with each other is increased as the contraction of the elastic body proceeds. Accordingly, the degree of the contraction may be determined based on the increasing number of the detection lines 78, and a multi-stage input may be performed based on the number of contacting detection lines 78.

Furthermore, the detection lines 78 that are arranged in matrix form in a lateral direction may be stacked on top of one another at regular intervals in a vertical direction. Accordingly, if vertical pressing is performed on the elastic body, the vertical pressing input PP on a point on which the vertical pressing has been performed may be performed as the detection lines 78 stacked on top of one another in the vertical direction are brought into contact with each other.

Even in this case, the number of contacting detection lines 78 is changed depending on the degree of the vertical pressing. In other words, as pressing force of the vertical pressing is increased, the number of contacting detection lines 78 is increased. Accordingly, the vertical pressing input may also be performed in multi stages based on the number of contacting detection lines 78.

Furthermore, the type of the detection unit capable of detecting lateral pressing and vertical pressing or tilting (upward, downward diagonal pressing) is not limited to the above embodiments. Detection units capable of detecting finger actions (lateral pressing and vertical pressing), such as a tactile sensor utilizing a force sensor, have recently been developed and commercialized more actively. A method of inputting predetermined data by lateral pressing and vertical pressing or tilting in a plurality of directions in a radial direction around a reference location using a finger, for example, based on the number of detection units, for example, detection sensors, capable of detecting the lateral pressing and vertical pressing of a finger (detecting four-faced vertical pressure or two-faced lateral line pressure), detected locations (a radial north or east detection), and the difference in a detection value (lateral force is detected when the detection value is less than a predetermined detection value, and vertical force is detected when the detection value is higher than a predetermined detection value) is considered to pertain to the scope of the present invention.

Basic Concept of Fifth Embodiment and Sixth Embodiment

In order to easily understand data input devices according to the fifth embodiment and the sixth embodiment, it is necessary to conceptually define an enterer's input action, the input portion motion of an input device, and detection information that is used to dissolve and detect the input portion motion.

The simplest button-type input structure, such as that shown in FIG. 37, will be described.

In FIG. 37, a hatched portion corresponding to a first actuation surface is the surface of a button or an input surface having a motion trajectory corresponding thereto. An enterer may place his finger on the button, including the first actuation surface, and may push the button laterally in the direction of first force, or may push the button in a diagonal direction, such as in the direction of third force.

Here, when the third force is dissolved, it may be divided into the first force parallel to first actuation surface and second force perpendicular to the first actuation surface, or may be divided into two or more forces similar to the first and second forces.

If the enterer first pushes the button laterally and then presses the button downwards or attempts to press the button rapidly, the enterer may press the button in an inclined direction.

Here, the lateral movement of the first actuation surface (here, the 'first' is interpreted to mean that a related entity is placed in the same plane as the first force, but does not means that second and third actuation surfaces necessarily exist. In a similar way, a first fixed surface to be presented below should also be interpreted to mean that it is place in the same plane as first momentum) may be detected in a form, such as deformation attributable to contact, pressing or contact pressing in the first detection portions having a circular band form, which are disposed around the first actuation surface. Alternatively, it may be detected as a corresponding change in an electric signal.

This detection structure may be applied to the case of the second force in the same manner. Whether the second force exists or not, or the intensity and acting location of the second force may be detected based on a detection principle similar to that of the first detection portion in the second detection portion placed under the first actuation surface.

FIG. 38 shows a slight improvement of the simplest input structure presented in FIG. 37. As shown in this drawing, a first detection portion 11 in which a plurality of first detection elements 111 is arranged is disposed around a first actuation surface 10, and, below the first detection portion 11, a plurality of second detection elements 121 is disposed in a second detection portion 12 having a disc shape, which is arranged parallel to the first detection portion 11 in a form similar to that of the first actuation surface 10.

The first detection portion may detect the vector quantity (direction and magnitude) of first force using the plurality of first detection elements arranged around the first actuation surface, and the second detection portion does not detect the direction of second force, which passes through the first actuation surface, due to a limited method for the arrangement of the second detection elements regardless of whether the second detection elements include one element or a plurality of elements, but may detect only magnitude (that is, the scalar quantity of the second force).

However, if a plurality of second detection elements is arranged closely, a predetermined acting location of the second force may be easily determined within the first actuation surface.

It can also be seen that a third detection portion 13 is further disposed in a circular ring shape in a space in which the first detection portion is close to the second detection portion.

If an enterer takes an action to push a button laterally and then press the button downwards using a finger's tip, this action can be interpreted to apply first force 1 to the first actuation surface in parallel thereto and then apply second force 2 to the first actuation surface in a direction that passes through the first actuation surface.

If the finger is tilted while the finger is being pressed, the acting location of the second force is changed from 2 through 2' to 2" (here, the magnitude of pressed force (the length of a force vector) will be changed slightly).

An action to press the button while pushing the button laterally in the state in which the finger is in contact with the button (this can be interpreted as third force) and then tilt the button again can be performed very rapidly and efficiently. However, the first detection portion and the second detection portion can extract a very large amount of input data from this simple successive operation.

For example, if the direction of the first force is set to eight directions, that is, the north, the south, the east and the west, the southeast, the southwest, the northwest and the northeast, the location of the change of the second force is set to four sections, that is, a northern section, a southern section, an eastern section and a western section, and an operation having magnitude equal to or higher than the specific reference value of the second force (a distinctive pressing operation corresponds to this operation) is set, 8*4*2=64 types of input data can be extracted from the above-described simple operation.

Here, the role of the third detection portion 13 is various. For example, when a user applies strong third force, the third detection portion 13 can assist the first detection portion and the second detection portion to classify the third force into the first force and the second force effectively, or when shock force is acting in the direction of the third force (shock-type touch to give a tap can be considered), the third detection portion 13 can be a detection portion capable of receiving such shock force.

The role of the third detection portion 13 can be more significant in fourth force 4 shown in the drawing. The fourth force 4 corresponds to a case where a button is used as a pressing-type dial. That is, when a complex operation of pushing the button laterally, pressing the button while pushing it forward again or pushing the button forward while pressing it is performed, the first detection portion can detect the parallel direction motion of the first actuation surface 10 more clearly and variously if the third detection portion 13 is set such that it can detect the rotation of the button.

A touch pad-type input structure, such as those in FIGS. 45(a), (b) and (c), will now be described.

The reason why a first fixed surface 10 of FIG. 45 uses the same reference numeral as the first actuation surface 10 of FIG. 38 is that the two surfaces basically have the same roles. In other words, an actuation surface transfers an enterer's force and direction as the external shape of the surface is moved, whereas a fixed surface transfers an enterer's momentum and pressure distribution location as the interior of the surface is deformed.

Here, the range within which the actuation surface can move is limited to a space in which the actuation surface is arranged (for example, the width and depth provided by a button casing 15 of FIG. 42), and can move to some extent or not depending on the type of detection of the detection portion.

In a similar way, the range within which the fixed surface can be deformed is limited to the width and thickness of the entire surface where the fixed surface is arranged and can be deformed to some extent or rarely deformed depending on the type of detection of a detection layer disposed under the fixed surface.

In FIG. 45(a), the fixed surface 10 may be set such that it can detect the momentum of a finger.

Momentum is the vector quantity, that is, the product of the mass and velocity of an object. Momentum has a unit of kgm/s and is information, indicating the mass, velocity, and motion direction of an object.

If a finger slides laterally while pressing the fixed surface 10 slightly, the velocity of the finger is increased and momentum toward the direction is detected.

However, if the finger pushes the fixed surface 10 laterally while pressing the fixed surface 10 hard, but does not slide on the fixed surface 10, momentum toward the direction is detected when the fixed surface is first deformed, but momentum is not detected because the velocity of the finger is 0 (the finger has not moved).

However, in this case, a pressure distribution area detected in the fixed surface is wide when the finger is pressed hard. In particular, as the fixed surface is easily deformed, the pressure distribution area can be further increased in proportion to the weight of the finger.

Such momentum and pressure distributions can be detected by at least one detection layer 14 in which detection lines 141, 142, which are vertically arranged, are embedded.

From FIG. 45(b), it can be seen that, when the finger is pushed in the direction of the first force while being in contact with the fixed surface, an input region in which the arrangement of the detection lines becomes dense due to the deformation of a detected surface disposed on the fixed surface, in particular, the detection layer, is moved. Accordingly, the movement of the input region, the current density of which is increased in response thereto, can be detected and converted into input data.

FIG. 45(*c*) shows a situation in which the finger comes into contact with the fixed surface and is then pressed while it is being tilted. At this time, the detection lines are further pressed downward, and thus pressed portions are widened.

It can be seen that the pressure distribution location is changed in the tilting direction (the direction of 2→2'→2") of the finger. Accordingly, the movement of the input region 142, the current density of which is decreased, can be detected and converted into input data.

Fifth Embodiment

FIG. 36 shows an information terminal in which a button-type input device according to the present invention is mounted.

Although, in the drawing, a first actuation surface 10 having a button shape is mounted in a casing 15 that accommodates the first actuation surface and is formed on one side of a main body of the information terminal, it is not necessary to mount the first actuation surface 10 in the main body of the information terminal.

For example, when the information terminal is a navigation device mounted in a car, the first actuation surface 10 and the built-in casing 15 may be mounted in the steering wheel of the car and then coupled to the navigation device.

In most car navigation devices, when an initial letter is entered in a keypad displayed on a touch screen, a complete syllable, completed by the initial letter, and a relevant menu are sequentially displayed.

However, when input is performed by successively operating the button-type first actuation surface 10 using first force 1, second force 2, and second force 2', the location of which has been changed, as shown in the drawing, a cursor, a key or a menu 50, which operates in response to the input, is moved and selected.

This operation, which is seen from the front side of an enterer's finger, is shown in FIG. 40.

FIG. 40 is a diagram conceptually showing the deformed shapes of detection portions attributable to the movement of the actuation surface in FIGS. 36 and 38. In this drawing, each of the first to third detection portions includes a polyhedral piezoelectric element, which can be elastically deformed and restored. The piezoelectric element may be constructed in the form of a polyhedron that uses at least one of the acting directions of the first to third forces as reference coordinates within the detection portion.

Although this will be described in the following sixth embodiment, each of the first to third detection portions employs a detection element that is formed by stacking at least two detection layers in each of which a plurality of elastically deformable and restorable current resistance lines is arranged, instead of polyhedral piezoelectric elements, and can have a detection layer having a form in which detection lines arranged parallel to a plane formed by at least two of the acting directions of the first to third forces are arranged.

With reference to FIG. 40, it can be seen intuitively that, when an enterer's finger is placed gently, the first detection element 111, the second detection element 121 and the third detection portion 13 are not contracted, expanded or shear-deformed, but the finger comes into contact with only the central one of three on/off detection elements 122, so that only a signal from the central on/off detection element is transmitted to a control module.

Thereafter, when the enterer's finger is moved in the direction of the first force, the first actuation surface 10 is moved laterally. At this time, the first detection elements 111 is contracted and deformed in the moving direction, but is expanded and deformed in a direction opposite to the moving direction.

In this case, the second detection elements 121 are shear-deformed in the moving direction, but come into contact with the third detection portion 3 as needed.

Next, when the finger is pressed toward the end of the fingernail using the second force, a corresponding part of the second detection elements 121 (the fingernail end area of the finger in the drawing) is contracted and deformed.

Finally, when the second force acting toward the end of the fingernail is tilted again and pressing is performed using this force, the location of the second force is changed (2→2'→2"). This causes the first detection elements and the second detection elements to be partially deformed additionally at the same time.

If the series of deformation stages of the detection elements are transmitted to the control module in detection signal form, the control module transmits an input signal, which is controlled through a control process, including On/Off, the distinguishing of input stages, the determination of an input order and the determination of input, based on preset control steps, to a signal processing unit.

An enterer's button manipulation is classified as the first force, the second force and the third force, and then the steps through which the first to three forces are converted into an input signal will be described with reference to FIG. 39.

FIG. 39 is a flowchart showing a process of generating an input signal for actuation force applied to an actuation surface when it is summed that, in the device, such as that shown in FIG. 36, an enterer's input action is classified as the first force for pushing a button along a button plane, the second force for pressing or pushing and then tilting the button, and the third force having the form of a combination of the first force and the second force.

In the drawing, the first to third forces are detected by the detection elements of detection portions that respectively correspond to the first to third forces. Here, in the case where an enterer places his finger on the button, this can be detected using an additional on/off detection portion. Alternatively, in consideration of the fact that the amount of change in the amount of detection by the second detection portion over time is not significant, an on/off control module may analyze the amount of a detected signal over a certain time period from the second detection portion and generate an on/off signal without depending on the on/off detection portion.

In the drawing, an input order determination control module performs a function of providing higher priority to a distinct signal of the third detection portion than signals of the first detection portion and the second detection portion when the third force in which the first force and the second force are combined together acts or a function of temporarily suspending the application of the second force and waiting for the first force if the second force is first applied due to an enterer's mistake in the case where input requirement environments that have been previously set are set to an input pattern of the second force following the first force.

In the drawing, an input stage distinguishing control module functions to determine the input start/input end/re-input start/re-input end of the remaining input signals based on the amount of temporal change of any one input signal when several forces are applied at the same time due to an enterer's mistake in the case where input requirement environments that have been previously set are set to an intermittent input pattern on a section basis when the first to third forces act through a complicated successive operation.

Meanwhile, in a stage next to the stage of the input stage distinguishing control module, there is further connected an input decision control module for determining the blocking/release of the remaining input signals based on an average signal quantity of any one of input signals, corresponding to the amounts of detection of the first to third detection portions, over a predetermined period of time.

The above control modules perform successive or non-successive/simultaneous or sequential/combinational or dissolving processes on the detection signals generated by the above detection portions, and transmit the resulting signals to the first to third control modules corresponding to the respective detection portions. The first to third control modules convert the transmitted signals into input signals, and then transmit the signals to the signal processing unit.

In order to prove the strong utility of the present invention and help the input concept presented in the present invention to be understood easily, an example of the actual implementation of the character input presented in FIG. 41 will be described.

As described above, in order to generate one Korean syllable '갱' in text message transmission using a currently commercialized mobile phone key, it is necessary to press keys five times (in the case of a Samsung mobile phone). However, in this case, the syllable can be input by pressing keys five times because the characters 'ㄱ' and 'ㅇ' are arranged in the first input locations of the corresponding key buttons. For example, in the case of the syllable '괜', one key press per consonant is added, and keys are pressed seven times.

Furthermore, in the case where one finger is used while keys are pressed five or seven times, the finger has to be moved four times additionally. Accordingly, great time loss, inconvenience, and entry error are incurred during this movement.

In FIG. 41, when an enterer waits shortly with his finger placed on a button, an input unit is turned on and a vowel menu is displayed.

When the enterer selects ㄱ by pushing the button in a left upward direction, ㄱ is displayed, and, at the same time, a single vowel menu for the next step is displayed.

In the case where a single vowel is not selected, when the button is pressed once, a diphthong menu for the next step is displayed.

Here, when ㅐ is selected by tilting the button (other than pushing the button) in a right upward direction, ㅐ is displayed and, at the same time, a vowel base menu for the next step is displayed.

Finally, when ㅇ is selected by pushing the button to the right side, 갱 is displayed and, at the same time, the syllable is completed.

In the entire input process of FIG. 41, the relative locations of the first actuation surface 10 and the first detection portion 11/the second detection portion 12/the third detection portion 13, which sensitively respond to the motion of the finger, can be seen.

The number of times keys have been pressed except that the first On step is performed is four. However, it should be noted that the finger has not been detached from the button even once. The most significant problem with a repetitive input process is that a finger must be frequently detached from the buttons and be then moved.

Accordingly, the conventional syllable input requires four substantial input periods (the number of time a finger is moved) while keys are pressed five times, only one substantial input period is sufficient for the input example of the present invention.

Here, natural movement in conformity with the shape of a finger and whether the successive inputs of the first force and the second force match each other are problematic.

These are solved by a portable terminal that has two first actuation surfaces 10 and in which a button-type input device for detecting the second force in two directions is mounted, which is shown in FIG. 42.

In the drawing, the first actuation surfaces 10 include at least two neighboring actuation surfaces arranged at different angles, and the two knuckles of a finger are placed on in the neighboring actuation surfaces, respectively.

In a single plane-shaped button, it is not easy to press the lower section of a button while a user's finger is being pushed upwards. However, in a button constructed as shown in FIG. 42, the lower section of the button can be pressed using the second knuckle of the finger while the finger is pushed upwards.

This means that menus can be disposed in the entire radial space with respect to a menu for next second force based on all the results of the first force.

Sixth Embodiment

FIG. 43 shows a touch pad-type input device, other than the button-type one of the fifth embodiment, which is a complex information device to which the present invention is applied.

Although, in the drawing, a complex information device having a traditional telephone shape, the case in which the first fixed surface 10 is disposed on the rim surface of a vehicle's steering wheel and a screen is projected onto the front window in a HUD (heal-up display) form may be used as the most attractive example, as described in the fifth embodiment.

In the drawing, when an enterer pushes the first fixed surface 10 in a right upward direction with his finger placed on the first fixed surface 10, a cursor 50 drags icons on the screen. Next, when the enterer changes a pressure distribution area on the first fixed surface by erecting his finger and vertically pressing the pressure distribution area with the erected finger, the cursor completes the dragging and selects the dragged icons.

Next, when the enterer presses the first fixed surface with the side of the finger while tilting the finger, the cursor moves the selected icons in a direction where the finger is tilted.

If this is conceptually defined again, this may be expressed as a process of generating a first input signal by detecting first momentum accumulated in a first direction parallel to the first fixed surface, a second input signal by detecting second pressure acting in a second direction perpendicular to the first fixed surface, and a third input signal corresponding to a changed distribution location of the second pressure by detecting it.

It is apparent that a process of generating a corresponding fourth input signal by applying the first momentum and the second pressure at the same time (shocking contact) in the same manner as the above first embodiment may also be added.

The most significant difference between the above successive operation and the conventional touch pad is that, if an enterer tilts his finger without erecting it, the cursor keeps a moving state, which means that movement on a wide screen, which could not be covered by the conventional touch pad, can be naturally covered using the input device of the present invention, like the movement of a mouse cursor.

Accordingly, an enterer can enjoy computing environment at a level almost identical to that of a desktop computer while viewing a display screen widely projected onto the front window of a vehicle using the button of the fifth embodiment and the touch pad of the sixth embodiment, which are provided on the steering wheel, for example, during driving.

FIG. 44 introduces a work flowchart showing a process of generating and processing an input signal for acting momentum and the distribution of acting pressure applied to the fixed surface of FIG. 43.

The process of processing the detection signal in FIG. 44 is entirely similar to that of FIG. 39 of the fifth embodiment. As described above in the process using FIG. 45, the first detection portion is set such that it detects first momentum instead of the first force, and the second detection portion is set such that it detects second pressure distribution instead of the second force.

However, unlike the button-type first actuation surface, it does not know where a finger will be placed on a first fixed surface. Accordingly, it is more efficient to add a control step of performing on/off when a finger remains intact for a predetermined time or more with the finger placed as it is, rather than using an additional on/off detection portion.

This function may include an on/off detection portion for detecting the amount of accumulated change in the second pressure, detected by the second detection portion, over time, and an on/off control module for generating an on/off signal for the first detection portion or the second detection portion in accordance with the amount of detection of the on/off detection portion.

Meanwhile, in the case of the first actuation surface, the lateral pushing motion and the downward pressing motion can be detected by the first and second detection portions, respectively, which are separately arranged, thereby decreasing interference between respective detection signals. However, in the first fixed surface type structure in which the deformable detection lines are arranged according to the present embodiment, lots of interference occurs between the lateral pushing motion (by pressing) and a simple pressing motion or pushing and tilting motion.

In order to appropriately distinguish them from each other, there may be added first and second control modules for generating input signals corresponding to the amounts of detection attributable to the respective motions, and a correction control module for generating the input signal of the correction of the second pressure from the amount of temporal change of the input signal generated by the first control module and the input signal of the correction of the first momentum from the amount of temporal change of the input signal generated by the second control module.

Hereinafter, at a control execution step, in the same manner as the fifth embodiment, there may be added an input stage distinguishing control module for determining input start/input end/re-input start/re-input end of input signals, which are generated by the first and second and correction control modules, based on the results of the comparison of the amount of input signal generated by the second control module with a preset input signal determination criterion, and an input determination control module coupled to the first and second and correction control modules and configured to determine blocking/release of the remaining input signals based on the average signal quantity of any one of the input signals, corresponding to the amounts of detection of the first and second detection portions, for a predetermined period of time.

The present invention is not limited to the above-described embodiments and has a wide range of application. The present invention can also be modified and practiced in various ways without departing from the gist of the invention set forth in the accompanying claims.

The invention claimed is:

1. A data input device using finger action detection, comprising:
   a detection unit provided in a predetermined input region formed on one side of a casing of a terminal for an electronic device, the detection unit processing
      first directional input that generates a first directional input signal through detection of lateral pressing in a predetermined radial direction by a finger placed at a reference location in the input region,
      second directional input that generates a second directional input signal through detection of vertical pressing in a predetermined direction in a state in which the finger is placed at the reference location,
      third directional input that generates a third directional input signal through detection of tilt pressing, which is performed by diagonally pressing the finger in a predetermined direction, in a state in which the finger is placed at the reference location, and
      fourth directional input that generates a fourth directional input signal through detection of a tilt input, which is performed by tilting the entire finger in a predetermined direction, in a state in which the finger is placed at the reference location; and
   a control unit configured to
      determine input locations of lateral pressing direction, vertical pressing direction, tilt pressing direction and tilting direction of the finger based on the first to fourth directional input signals,
      extract data assigned to the corresponding input locations from a memory and
      input the extracted data.

2. The data input device as set forth in claim 1, wherein the detection unit comprises a first piezoelectric detection panel having a concave detection region corresponding to a shape of a contact surface of the finger, the first piezoelectric detection panel being provided with the plurality of vertical pressing locations and the lateral pressing directions that are sequentially and radially disposed at different intervals based on the reference location located at a center of the contact surface, wherein the vertical pressing locations, the lateral pressing directions, and the vertical pressing locations and the lateral pressing directions are partitioned by deformation prevention grooves.

3. The data input device as set forth in claim 1, wherein the detection unit comprises:
   a second piezoelectric detection panel configured to come into contact with the finger, to detect the vertical pressing, and to generate the second directional input signal; and
   a third piezoelectric detection panel provided under and in contact with the second piezoelectric detection panel, and configured to detect pushing of the second piezoelectric detection panel in contact with the third piezoelectric detection panel during the lateral pressing, and to generate the first directional input signal.

4. The data input device as set forth in claim 1, wherein the detection unit comprises:
   a fourth piezoelectric detection panel configured to come into contact with the finger, to detect the vertical pressing, and to generate the second directional input signal;
   a plurality of vertical projections projecting downward from the fourth piezoelectric detection panel; and
   a first moving detection portion provided in each of the lateral pressing directions around each of the vertical projections, and configured to come into contact with the vertical projections or to be pressed during the lateral pressing, and to generate the first directional input signal.

5. The data input device as set forth in claim 1, wherein the detection unit comprises:
   a fifth piezoelectric detection panel provided with a through hole at the reference location, and configured to detect the vertical pressing and to generate the second directional input signal; and
   a second moving detection portion inserted into the through hole, provided to be able to be tilted in each radial direction by the finger, and configured to generate the first directional input signal corresponding to the lateral pressing during the lateral pressing.

6. The data input device as set forth in claim 1, wherein the detection unit comprises:
   a plurality of sixth piezoelectric detection portions disposed at different intervals around the reference location in band form, and configured to detect the vertical pressing and to generate the second directional input signal; and
   a plurality of seventh piezoelectric detection portions disposed between the sixth piezoelectric detection portions, and configured to have a height lower than that of the sixth piezoelectric detection portions such that the seventh piezoelectric detection portions are not pressed by the finger during the vertical pressing, to be pressed in the lateral pressing direction by the sixth piezoelectric detection portions during the lateral pressing, and to generate the first directional input signal.

7. The data input device as set forth in claim 1, wherein the detection unit comprises:
   an eighth piezoelectric detection panel configured to come into contact with the finger, to detect the vertical pressing, and to generate the second directional input signal; and
   third moving detection portions provided outside the eighth piezoelectric detection panel, and configured to detect contact by pushing of the eighth piezoelectric detection panel during the lateral pressing and to generate the first directional input signal.

8. The data input device as set forth in claim 1, wherein the detection unit comprises:
   a ninth piezoelectric detection panel configured to come into contact with the finger, to detect the vertical pressing, and to generate the second directional input signal;
   fourth moving detection portions provided in the ninth piezoelectric panel to correspond to the respective radial directions around the reference location, and configured to detect contact by pushing of the ninth piezoelectric detection panel during the lateral pressing and to generate the first directional input signal; and
   a rotation detection portion having a ring shape that is spaced apart from the reference location at a predetermined interval.

9. The data input device as set forth in claim 1, wherein:
   the detection unit is provided as a piezoelectric detection panel configured to be elastically deformed by pressing of the finger; and
   the control unit
      determines that the finger has been placed on the piezoelectric detection panel if pressing force detected by the piezoelectric detection panel is equal to or greater than a set value and equal to or lower than 3 times the set value,
      determines that the pressing is the lateral pressing if the pressing force is equal to or greater than 3 times the set value and lower than 7 times the set value, and
      determines that the pressing is the vertical pressing if the pressing force is equal to or greater than 7 times the set value.

10. The data input device as set forth in claim 1, wherein the detection unit further generates a central input signal that is generated through detection of pressing of the reference location by the finger.

11. The data input device according to claim 1, wherein at least one of the first directional input signal, the second directional input signal and the central input signal is divided into two or more multi-stage signals based on intensity of pressing force, and then the multi-stage signals are generated.

12. The data input device as set forth in claim 1, wherein
   the reference location is provided to move along with a contact location of the finger placed on the detection unit, and
   the vertical pressing location is moved along with the reference location.

13. The data input device as set forth in claim 1, wherein
   the detection unit further generates a central detection signal that is generated when placing of a finger at the reference location is detected, and
   the control unit inputs first data, assigned to the vertical pressing location, when the central detection signal and the second directional input signal are simultaneously generated, and inputs second data, additionally assigned to the vertical pressing location, when only the second directional input signal is generated.

14. The data input device as set forth in claim 13, further comprising a keyboard display unit for displaying data assigned to the respective lateral pressing directions and the respective vertical pressing locations, the keyboard display unit selectively displaying the first data and the second data depending on whether the central detection signal has been generated or not.

15. The data input device as set forth in claim 1, wherein,
   the detection unit is configured to be contracted and relaxed in response to pressing, and to generate the directional input signals respectively on the plurality of indication locations using a current value that varies in response to the contraction and the relaxation; and
   the control unit determines a change of the current value based on the directional input signals, extracts data assigned to the change of the current value from a memory unit, and inputs the extracted data.

16. The input device as set forth in claim 1, wherein, in a state that any one of the directional inputs has been performed, another directional input can be performed, thereby enabling respective pieces of data, assigned to the respective directional inputs, to be input together.

17. A data input device using finger action detection, the data input device being provided with a predetermined detection region in a terminal for an electronic device, comprising:
   a detection unit for detecting at least one of lateral pressing and vertical pressing at a reference location, which is indicated by contact or pressing of the finger with or on the detection region, and at a plurality of first indication locations, which are arranged in a radial direction around the reference location and are indicated, in the detection region, and generating a first directional input signal corresponding to the lateral pressing and a second directional input signal corresponding to the vertical pressing; and a control unit for determining a lateral pressing point and vertical pressing direction of the finger based on the first directional input signal and the second directional input signal, extracting data, assigned to the first directional input signal and the second directional input signal, from a memory unit, and inputting the extracted data, wherein the reference location can be displaced, and the first indication locations are moved along with the displacement of the reference location, wherein the reference location and the first indication locations are disposed within a range that can be covered with one finger; and the detection unit can distinguish and detect an entire input mode in which at least one of lateral pressing input and vertical pressing input is performed on one of the first indication locations while the finger contacts the reference location, and a partial input mode in which at least one of the lateral pressing input and the vertical pressing input is performed on one of the first indication locations while the finger does not contact the reference location.

18. The data input device as set forth in claim 17, wherein, when both the lateral pressing and the vertical pressing are detected within a set time, the detection unit determines the pressing to be tilt pressing, and the control unit inputs data, different from data of the lateral pressing and the vertical pressing, for the tilt pressing.

19. An input device, comprising:
a first detection portion for detecting a vector quantity of first force acting in a first direction parallel to a first actuation surface;
a second detection portion for detecting (a) a scalar quantity of second force acting in a second direction perpendicular to the first actuation surface and (b) a location where the second force is applied to the first actuation surface;
first and second control modules for generating input signals corresponding to detection amounts of the first and second detection portions, respectively;
at least one third detection portion for detecting third force acting in third directions that are not parallel to both the first actuation surface and the second direction; and
a third control module for generating an input signal corresponding to a detection amount of the third detection portion.

20. The input device as set forth in claim 19, wherein the first to third detection portions comprise a polyhedral piezoelectric element that can be elastically deformed and restored, and the piezoelectric element is a polyhedron in which at least one of acting directions of the first to third forces is used as a reference coordinate within the detection portion.

21. A data input device using finger action detection, the data input device comprising:
a detection unit provided in an input region formed on a casing of an electronic device, wherein the detection unit is configured to (a) detect a lateral pressing applied in a first radial direction by a finger placed at a reference location in the input region, and generate a first directional input signal in response to detection of the lateral pressing, (b) detect a vertical pressing applied in a second direction by the finger, and generate a second directional input signal in response to detection of the vertical pressing, (c) detect a tilt pressing applied in a third diagonal direction by the finger, and generate a third directional input signal in response to detection of the tilt pressing, and (d) detect a tilt input applied by tilting the finger in a fourth direction, and generate a fourth directional input signal in response to detection of the tilt input; and a control unit configured to (a) determine at least one of a first input location of the lateral pressing based on the first directional input signal, a second input location of the vertical pressing based on the second directional input signal, a third input location of the tilt pressing based on the third directional input signal, and a fourth input location of the tilt input based on the fourth directional input signal, (b) extract data assigned to at least one of the first, second, third and fourth input locations from a memory, and (c) input the extracted data.

22. A data input device using finger action detection, the data input device comprising:
a detection region that is provided on an electronic device and that is configured to receive a finger thereon, wherein (a) the detection region includes a reference location and a plurality of indication locations which are arranged radially around the reference location, (b) the reference location and the indication locations are disposed within a range that can be covered by the finger, and (c) the plurality of indication locations are configured to move in response to movement of the reference location;
a detection unit configured to (a) detect at least one of a lateral pressing and a vertical pressing in the detection region, (b) detect an entire input mode in which at least one of the lateral pressing and the vertical pressing is performed on at least one of the indication locations while the finger is in contact with the reference location, (c) detect a partial input mode in which at least one of the lateral pressing and the vertical pressing is performed on at least one of the indication locations while the finger is not in contact with the reference location, (d) generate a first directional input signal in response to detection of the lateral pressing, and (e) generate a second directional input signal in response to detection of the vertical pressing; and
a control unit configured to (a) determine at least one of a lateral pressing point based on the first directional input signal, and a vertical pressing direction based on the second directional input signal, (b) extract data assigned to at least one of the first and second directional input signals from a memory unit, and (c) input the extracted data.

23. An input device comprising:
a first detection portion configured to detect a vector quantity of a first force acting in a first direction that is parallel to an actuation surface;
a first control module configured to generate a first input signal corresponding to the vector quantity of the first force;
a second detection portion configured to detect (a) a scalar quantity of a second force acting in a second direction that is perpendicular to the actuation surface, and (b) a location where the second force is applied to the actuation surface;
a second control module configured to generate a second input signal corresponding to the scalar quantity of the second force;
a third detection portion configured to detect a quantity associated with a third force acting in a third direction that is parallel to neither the first actuation surface nor the second direction; and
a third control module configured to generate a third input signal corresponding to the quantity associated with the third force.

* * * * *